United States Patent
Zhang et al.

(10) Patent No.: US 11,983,493 B2
(45) Date of Patent: May 14, 2024

(54) DATA PROCESSING METHOD AND PRONOUN RESOLUTION NEURAL NETWORK TRAINING METHOD

(71) Applicant: TENCENT TECHNOLOGY (SHENZHEN) COMPANY LIMITED, Shenzhen (CN)

(72) Inventors: Jinchao Zhang, Shenzhen (CN); Fandong Meng, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 406 days.

(21) Appl. No.: 17/339,933

(22) Filed: Jun. 4, 2021

(65) Prior Publication Data

US 2021/0294972 A1 Sep. 23, 2021

Related U.S. Application Data

(63) Continuation of application No. PCT/CN2020/084432, filed on Apr. 13, 2020.

(30) Foreign Application Priority Data

Apr. 19, 2019 (CN) .......................... 201910319013.8

(51) Int. Cl.
*G06F 40/253* (2020.01)
*G06F 18/214* (2023.01)
(Continued)

(52) U.S. Cl.
CPC .......... *G06F 40/253* (2020.01); *G06F 18/214* (2023.01); *G06F 40/211* (2020.01); *G06F 40/247* (2020.01); *G06N 3/08* (2013.01)

(58) Field of Classification Search
CPC .... G06F 40/253; G06F 40/247; G06F 40/211; G06F 18/214; G06N 3/08
See application file for complete search history.

(56) References Cited

U.S. PATENT DOCUMENTS

| | | | |
|---|---|---|---|
| 2016/0253309 A1* | 9/2016 | Zhao ...................... | G06F 40/211 704/9 |
| 2018/0203848 A1* | 7/2018 | Perez ....................... | G10L 25/30 |

(Continued)

FOREIGN PATENT DOCUMENTS

| | | |
|---|---|---|
| CN | 108595408 A | 9/2018 |
| CN | 109165386 A | 1/2019 |

(Continued)

OTHER PUBLICATIONS

Y. Zhang and P. Jin, "The Research on Chinese Coreference Resolution Based on Support Vector Machines," 2010 Fourth International Conference on Genetic and Evolutionary Computing, Shenzhen, China, 2010, pp. 169-172, doi: 10.1109/ICGEC.2010.49. (Year: 2010).*

(Continued)

*Primary Examiner* — Vijay B Chawan
*Assistant Examiner* — Daniel W Chung
(74) *Attorney, Agent, or Firm* — ANOVA LAW GROUP, PLLC

(57) ABSTRACT

A data processing method includes: obtaining a to-be-detected text, and determining a context word set and a candidate substitute word set corresponding to a to-be-detected word in the to-be-detected text to be inputted into a pronoun resolution neural network for feature extraction; performing positive-example iteration processing and negative-example iteration processing on the features corresponding to the context word set and the candidate substitute word set, to obtain a positive-example feature vector length and a negative-example feature vector length, and calculat- (Continued)

ing a substitute probability corresponding to each candidate substitute word in the candidate substitute word set according to the positive-example feature vector length and the negative-example feature vector length; determining a target substitute word according to the substitute probability corresponding to the each candidate substitute word; and inserting the target substitute word into the to-be-detected text according to a position corresponding to the to-be-detected word, to obtain a target text.

18 Claims, 12 Drawing Sheets

(51) Int. Cl.
    *G06F 40/211*     (2020.01)
    *G06F 40/247*     (2020.01)
    *G06N 3/08*     (2023.01)

(56) References Cited

U.S. PATENT DOCUMENTS

2019/0188257 A1* 6/2019 Iida .................... G06N 5/01
2022/0083837 A1* 3/2022 Hashimoto ............ G06N 3/08

FOREIGN PATENT DOCUMENTS

CN     110162785 A     8/2019
WO     2018174815 A1     9/2018

OTHER PUBLICATIONS

The World Intellectual Property Organization (WIPO) International Search Report for PCT/CN2020/084432 dated Jul. 6, 2020 8 Pages (including translation).

Saoussen Mathlouthi Bouzid et al., "How to combine salience factors for Arabic Pronoun Anaphora Resolution," 2017 IEEE/ACS 14th international Conference on Computer Systems and Applications, Nov. 30, 2017 (Oct. 30, 2017). 8 pages.

Geoffrey E Hinton et al., "Transforming Auto-encoders," In International Conference on Artificial Neural Networks, 2011. 8 pages.

Sara Sabour et al., "Dynamic Routing Between Capsules," In Advances in neural information processing systems, 2017. 11 pages.

Chen Chen et al., "Chinese Zero Pronoun Resolution with Deep Neural Networks," In Proceedings of the 54th Annual Meeting of the Association for Computational Linguistics, vol. 1, 2016, pp. 778-788. 11 pages.

Qingyu Yin et al., "A Deep Neural Network for Chinese Zero Pronoun Resolution," In Proceedings of the Twenty-Sixth International Joint Conference on Artificial Intelligence (IJCAI-17), 2017, pp. 3322-3328. 7 pages.

Qingyu Yin et al., "Chinese Zero Pronoun Resolution with Deep Memory Network," In Proceedings of the 2017 Conference on Empirical Methods in Natural Language Processing, 2017, pp. 1309-1318. 10 pages.

Qingyu Yin et al., "Deep Reinforcement Learning for Chinese Zero Pronoun Resolution," In Proceedings of the 56th Annual Meeting of the Association for Computational Linguistics (vol. 1: Long Papers), 2018, pp. 569-578. Association for Computational Linguistics. 10 pages.

Jacob Devlin et al., "BERT: Pre-training of Deep Bidirectional Transformers for Language Understanding," arXiv preprint arXiv:1810.04805, Oct. 11, 2018. 14 pages.

* cited by examiner

Require: low-level capsules u, iteration time r
Ensure: category capsules vector lengths $\|v\|$
1: // Initialization
2: for all capsule i in feature capsules and capsule j in category capsules: do
3:      $k_j = \tanh(\sum_i u_i)$,
4:      $\hat{u}_{j|i} = \hat{w}_{ij} \cdot u_i$,
5: end for
6: // Iteration
7: for r in iterations: do
8:      for all capsule i in feature capsules and capsule j in category capsules: do
9:          $\alpha_{ij} = \hat{u}_{j|i} \cdot k_j$,
10:      end for
11:      for all capsule j in category capsules: do
12:          $c_j = softmax(\alpha_j)$,
13:          $v_j = squash(\sum_i c_{ij} \hat{u}_{j|i})$,
14:          $k_j = \frac{(k_j + v_j)}{2}$
15:          if last iteration: then
16:              $\|v_j\| = \|w_j \cdot v_j\|$
17:          end if
18:      end for
19: end for

FIG. 6

| sys | NW(84) | MZ(162) | WB(284) | BN(390) | BC(510) | TC(283) | Overall |
|---|---|---|---|---|---|---|---|
| Zhao and Ng (2007) | 40.5 | 28.4 | 40.1 | 43.1 | 44.7 | 42.8 | 41.5 |
| Chen and Ng (2015) | 46.4 | 39.0 | 51.8 | 53.8 | 49.4 | 52.7 | 50.2 |
| Chen and Ng (2016) | 48.8 | 41.5 | 56.3 | 55.4 | 50.8 | 53.1 | 52.2 |
| Liu et al. (2017) | 59.2 | 51.3 | 60.5 | 53.9 | 55.5 | 52.9 | 55.3 |
| Yin et al. (2017a) | 50.0 | 45.0 | 55.9 | 53.3 | 55.3 | 54.4 | 53.6 |
| Yin et al. (2017b) | 48.8 | 46.3 | 59.8 | 58.4 | 53.2 | 54.8 | 54.9 |
| Yin et al. (2018a) | 63.1 | 50.2 | 63.1 | 56.7 | 57.5 | 54.0 | 57.2 |
| Yin et al. (2018b) | 64.3 | 52.5 | 62.0 | 58.5 | 57.6 | 53.2 | 57.3 |
| ZP-CapsNet | 63.1 | 53.9 | 65.3 | 60.3 | 53.4 | 56.9 | 59.8 |

DATA PROCESSING METHOD AND PRONOUN RESOLUTION NEURAL NETWORK TRAINING METHOD

CROSS-REFERENCES TO RELATED APPLICATIONS

This application is a continuation application of PCT Patent Application No. PCT/CN2020/084432, entitled "DATA PROCESSING METHOD AND PRONOUN RESOLUTION NEURAL NETWORK TRAINING METHOD" and filed on Apr. 13, 2020, which claims priority to Chinese Patent Application No. 201910319013.8, entitled "Data Processing Method and Pronoun resolution Neural Network Training Method" filed on Apr. 19, 2019, both of which are incorporated by reference in their entirety.

FIELD OF THE TECHNOLOGY

The present disclosure relates to the field of computer technology, and specifically to a data processing method and apparatus, a computer-readable storage medium, and a computer device, as well as a pronoun resolution neural network training method and apparatus, a computer-readable storage medium, and a computer device.

BACKGROUND OF THE DISCLOSURE

Pronoun resolution technology has emerged as computer technology advances. The pronoun resolution refers to the identification of a candidate substitute word referred to by a pronoun in a given to-be-detected text using an algorithm. The current means for solving the pronoun resolution problem is to build a neural network model, to obtain a target candidate substitute word referred to by the pronoun according to the prediction made by the neural network. However, the current neural network directly classifies the pronoun and the corresponding candidate substitute words to obtain the target candidate substitute word, thereby causing low accuracy of the pronoun resolution.

SUMMARY

The embodiments of the present disclosure provide a data processing method and apparatus, a computer-readable storage medium, and a computer device capable of improving the accuracy of the pronoun resolution, as well as provide a pronoun resolution neural network training method and apparatus, a computer-readable storage medium, and a computer device.

In an aspect, a data processing method is provided, including: obtaining a to-be-detected text, and determining a context word set and a candidate substitute word set corresponding to a to-be-detected word in the to-be-detected text; inputting the context word set and the candidate substitute word set into a pronoun resolution neural network, and performing, by the pronoun resolution neural network, feature extraction respectively on the context word set and the candidate substitute word set to obtain a first feature and a second feature; performing, by the pronoun resolution neural network, positive-example iteration processing according to the first feature and the second feature to obtain a corresponding positive-example feature vector length, performing negative-example iteration processing according to the first feature and the second feature to obtain a corresponding negative-example feature vector length, and calculating a substitute probability corresponding to each candidate substitute word in the candidate substitute word set according to the positive-example feature vector length and the negative-example feature vector length; determining a target substitute word according to the substitute probability corresponding to the each candidate substitute word; and inserting the target substitute word into the to-be-detected text according to a position corresponding to the to-be-detected word, to obtain a target text.

In another aspect, a data processing apparatus is provided, including: a to-be-detected text obtaining module, configured to obtain a to-be-detected text, and determine a context word set and a candidate substitute word set corresponding to a to-be-detected word in the to-be-detected text; a feature extraction module, configured to input the context word set and the candidate substitute word set into a pronoun resolution neural network, and perform, by the pronoun resolution neural network, feature extraction respectively on the context word set and the candidate substitute word set to obtain a first feature and a second feature; an iteration processing module, configured to perform, by the pronoun resolution neural network, positive-example iteration processing according to the first feature and the second feature to obtain a corresponding positive-example feature vector length, perform negative-example iteration processing according to the first feature and the second feature to obtain a corresponding negative-example feature vector length, and calculate a substitute probability corresponding to each candidate substitute word in the candidate substitute word set according to the positive-example feature vector length and the negative-example feature vector length; a target substitute word determining module, configured to determine a target substitute word according to the substitute probability corresponding to the each candidate substitute word; and a target substitute word inserting module, configured to insert the target substitute word into the to-be-detected text according to a position corresponding to the to-be-detected word, to obtain a target text.

In another aspect, a computer device is provided, including a memory, a processor, and a computer program stored in the memory and capable of being run on the processor, when executing the computer program, the processor implementing the following operations: obtaining a to-be-detected text, and determining a context word set and a candidate substitute word set corresponding to a to-be-detected word in the to-be-detected text; inputting the context word set and the candidate substitute word set into a pronoun resolution neural network, and performing, by the pronoun resolution neural network, feature extraction respectively on the context word set and the candidate substitute word set to obtain a first feature and a second feature; performing, by the pronoun resolution neural network, positive-example iteration processing according to the first feature and the second feature to obtain a corresponding positive-example feature vector length, performing negative-example iteration processing according to the first feature and the second feature to obtain a corresponding negative-example feature vector length, and calculating a substitute probability corresponding to each candidate substitute word in the candidate substitute word set according to the positive-example feature vector length and the negative-example feature vector length; determining a target substitute word according to the substitute probability corresponding to the each candidate substitute word; and inserting the target substitute word into the to-be-detected text according to a position corresponding to the to-be-detected word, to obtain a target text.

In another aspect, a non-transitory computer-readable storage medium is provided, storing a computer program, the computer program, when executed by a processor, causing the processor to perform the following operations: obtaining a to-be-detected text, and determining a context word set and a candidate substitute word set corresponding to a to-be-detected word in the to-be-detected text; inputting the context word set and the candidate substitute word set into a pronoun resolution neural network, and performing, by the pronoun resolution neural network, feature extraction respectively on the context word set and the candidate substitute word set to obtain a first feature and a second feature; performing, by the pronoun resolution neural network, positive-example iteration processing according to the first feature and the second feature to obtain a corresponding positive-example feature vector length, performing negative-example iteration processing according to the first feature and the second feature to obtain a corresponding negative-example feature vector length, and calculating a substitute probability corresponding to each candidate substitute word in the candidate substitute word set according to the positive-example feature vector length and the negative-example feature vector length; determining a target substitute word according to the substitute probability corresponding to the each candidate substitute word; and inserting the target substitute word into the to-be-detected text according to a position corresponding to the to-be-detected word, to obtain a target text.

In another aspect, a pronoun resolution neural network training method is provided, including: obtaining a training text, the training text including a corresponding standard training text tag; determining a training context word set and a training candidate substitute word set corresponding to a to-be-detected word in the training text; inputting the training context word set and the training candidate substitute word set into an initial pronoun resolution neural network, and performing, by the initial pronoun resolution neural network, feature extraction respectively on the training context word set and the training candidate substitute word set, to obtain a first training feature and a second training feature; performing, by the initial pronoun resolution neural network, positive-example iteration processing according to the first training feature and the second training feature, to obtain a corresponding positive-example training feature vector length, performing negative-example iteration processing according to the first training feature and the second training feature, to obtain a corresponding negative-example training feature vector length, and calculating a training substitute probability corresponding to each training candidate substitute word in the training candidate substitute word set according to the positive-example training feature vector length and the negative-example training feature vector length; calculating a training loss value according to the training substitute probability corresponding to the each training candidate substitute word and the corresponding standard training text tag; and adjusting a model parameter of the initial pronoun resolution neural network according to the training loss value until a convergence condition is satisfied, to obtain the pronoun resolution neural network.

In another aspect, a pronoun resolution neural network training apparatus is provided, including: a training text obtaining module, configured to obtain a training text, the training text including a corresponding standard training text tag; a training text processing module, configured to determine a training context word set and a training candidate substitute word set corresponding to a to-be-detected word in the training text; a training feature representation module, configured to input the training context word set and the training candidate substitute word set into an initial pronoun resolution neural network, and perform, by the initial pronoun resolution neural network, feature extraction respectively on the training context word set and the training candidate substitute word set, to obtain a first training feature and a second training feature; a training feature iteration processing module, configured to perform, by the initial pronoun resolution neural network, positive-example iteration processing according to the first training feature and the second training feature, to obtain a corresponding positive-example training feature vector length, perform negative-example iteration processing according to the first training feature and the second training feature, to obtain a corresponding negative-example training feature vector length, and calculate a training substitute probability corresponding to each training candidate substitute word in the training candidate substitute word set according to the positive-example training feature vector length and the negative-example training feature vector length; a training loss value calculating module, configured to calculate a training loss value according to the training substitute probability corresponding to the each training candidate substitute word and the corresponding standard training text tag; and a neural network training module, configured to adjust a model parameter of the initial pronoun resolution neural network according to the training loss value until a convergence condition is satisfied, to obtain the pronoun resolution neural network.

In another aspect, a computer device is provided, including a memory, a processor, and a computer program stored in the memory and capable of being run on the processor, when executing the computer program, the processor implementing the following operations: obtaining a training text, the training text including a corresponding standard training text tag; determining a training context word set and a training candidate substitute word set corresponding to a to-be-detected word in the training text; inputting the training context word set and the training candidate substitute word set into an initial pronoun resolution neural network, and performing, by the initial pronoun resolution neural network, feature extraction respectively on the training context word set and the training candidate substitute word set, to obtain a first training feature and a second training feature; performing, by the initial pronoun resolution neural network, positive-example iteration processing according to the first training feature and the second training feature, to obtain a corresponding positive-example training feature vector length, performing negative-example iteration processing according to the first training feature and the second training feature, to obtain a corresponding negative-example training feature vector length, and calculating a training substitute probability corresponding to each training candidate substitute word in the training candidate substitute word set according to the positive-example training feature vector length and the negative-example training feature vector length; calculating a training loss value according to the training substitute probability corresponding to the each training candidate substitute word and the corresponding standard training text tag; and adjusting a model parameter of the initial pronoun resolution neural network according to the training loss value until a convergence condition is satisfied, to obtain the pronoun resolution neural network.

In another aspect, a non-transitory computer-readable storage medium is provided, storing a computer program, the computer program, when executed by a processor, causing the processor to perform the following operations: obtaining a training text, the training text including a corresponding standard training text tag; determining a training context word set and a training candidate substitute word set corresponding to a to-be-detected word in the training text; inputting the training context word set and the training candidate substitute word set into an initial pronoun resolution neural network, and performing, by the initial pronoun resolution neural network, feature extraction respectively on the training context word set and the training candidate substitute word set, to obtain a first training feature and a second training feature; performing, by the initial pronoun resolution neural network, positive-example iteration processing according to the first training feature and the second training feature, to obtain a corresponding positive-example training feature vector length, performing negative-example iteration processing according to the first training feature and the second training feature, to obtain a corresponding negative-example training feature vector length, and calculating a training substitute probability corresponding to each training candidate substitute word in the training candidate substitute word set according to the positive-example training feature vector length and the negative-example training feature vector length; calculating a training loss value according to the training substitute probability corresponding to the each training candidate substitute word and the corresponding standard training text tag; and adjusting a model parameter of the initial pronoun resolution neural network according to the training loss value until a convergence condition is satisfied, to obtain the pronoun resolution neural network.

In accordance with the above data processing method and apparatus, the computer-readable storage medium, and the computer device, as well as the pronoun resolution neural network training method and apparatus, the computer-readable storage medium, and the computer device, the pronoun resolution neural network can make good use of the features corresponding to the context word sequence and the candidate substitute words in the to-be-detected text. By performing the positive-example iteration processing and the negative-example iteration processing on the features corresponding to the context word sequence and the candidate substitute words, the positive-example feature vector length and the negative-example feature vector length are obtained. Finally, the substitute probability corresponding to each candidate substitute word in the candidate substitute word set is calculated according to the positive-example feature vector length and the negative-example feature vector length. The pronoun resolution neural network well fuses the features corresponding to the context word sequence and the candidate substitute words, in order to calculate the substitute probabilities corresponding to the candidate substitute words according to the features corresponding to the context word sequence and the candidate substitute words, the features including not only those of the word sequence but also the features of the character sequence corresponding to the word sequence. Thus, it can resolve the data sparseness problem, so as to improve the accuracy of the substitute probability corresponding to each candidate substitute word in the candidate substitute word set, thereby enhancing the accuracy of the pronoun resolution.

BRIEF DESCRIPTION OF THE DRAWINGS

FIG. 6 is a schematic diagram of coding of positive-example iteration processing or negative-example iteration processing according to an embodiment.

DESCRIPTION OF EMBODIMENTS

To make the objectives, technical solutions, and advantages of the present disclosure clearer, the following further describes the present disclosure in detail with reference to the accompanying drawings and the embodiments. The specific embodiments described herein are merely used to explain the present disclosure but are not intended to limit the present disclosure.

In linguistics, if a target object is mentioned earlier in a sentence, when the target object is mentioned again, the discourse may be contextualized in various ways to implicitly refer to the target object. This technique is called zero pronoun. The embodiments of the present disclosure may be used for resolving the zero-pronoun problem. In the field of natural language processing, computers need to understand the target object. Thus, in the natural language processing, the target object of the zero-pronoun needs to be added to where it is omitted. For instance, the natural sentence "Jack was disturbed by Linda, and was late." The second half of the sentence "was late" omits the target object "Jack", thus the sentence after the zero-pronoun processing may be "Jack was disturbed by Linda, and Jack was late."

The embodiments of the present disclosure provide an efficient method for processing natural language having the zero-pronoun problem. Please refer to the following embodiments for details.

Figure 1:
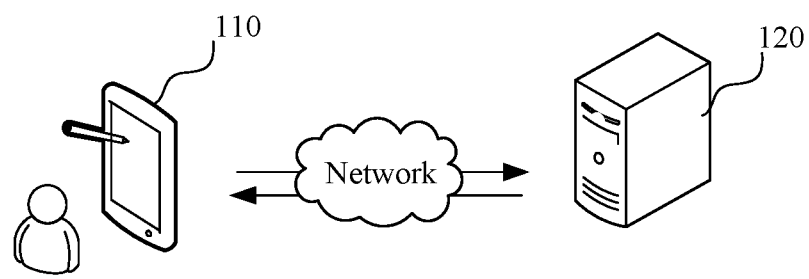
FIG. 1 is an application environment diagram of a data processing method or a pronoun resolution neural network training method according to an embodiment.

FIG. 1 is an application environment diagram of a data processing method or a pronoun resolution neural network training method. Referring to FIG. 1, the data processing method is applied to a data processing system. The data processing system includes a terminal 110 and a server 120. The terminal 110 and the server 120 are connected via a network. Specifically, the terminal 110 may be a desktop terminal or a mobile terminal. The mobile terminal may be at least one of a mobile phone, a tablet computer, and a notebook computer. The server 120 may be an independent server or a server cluster including servers.

The data processing method provided in the embodiments of the present disclosure may be executed by any device having a processor and a memory. In a possible manner, the device may independently perform the data processing method provided in the embodiments of the present disclosure. In another possible manner, the device may cooperate with other devices to jointly perform the data processing method. For instance, a storage server cluster and a computing server cluster cooperate to perform the data processing method provided in the embodiments of the present disclosure.

In one embodiment, the terminal 110 transmits a to-be-detected text to the server 120. The server 120 obtains the to-be-detected text, determines a context word set and a candidate substitute word set corresponding to a to-be-detected word in the to-be-detected text, and inputs the context word set and the candidate substitute word set into a pronoun resolution neural network. The pronoun resolution neural network performs feature extraction respectively on the context word set and the candidate substitute word set, to obtain a corresponding first and second feature. The pronoun resolution neural network performs positive-example iteration processing according to the first feature and the second feature, to obtain a corresponding positive-example feature vector length; performs negative-example iteration processing according to the first feature and the second feature, to obtain a corresponding negative-example feature vector length; calculates a substitute probability corresponding to each candidate substitute word in the candidate substitute word set according to the positive-example feature vector length and the negative-example feature vector length; determines a target substitute word according to the substitute probability corresponding to the each candidate substitute word; and inserts the target substitute word into the to-be-detected text according to a position of the to-be-detected word, so as to obtain a target text. In one embodiment, the server 120 transmits the target text to the terminal 110 for display.

In another embodiment, FIG. 1 may also be an application environment diagram of a pronoun resolution neural network training method. Referring to FIG. 1, the pronoun resolution neural network training method is applied to a pronoun resolution neural network training system. The pronoun resolution neural network training system includes a terminal 110 and a server 120. The terminal 110 and the server 120 are connected via a network. Specifically, the terminal 110 may be a desktop terminal or a mobile terminal. The mobile terminal may be at least one of a mobile phone, a tablet computer, and a notebook computer. The server 120 may be an independent server or a server cluster including servers.

In one embodiment, the terminal 110 transmits a training text to the server 120. The server 120 obtains the training text including a corresponding standard training text tag, determines a training context word set and a training candidate substitute word set corresponding to a to-be-detected word in the training text, and inputs the training context word set and the training candidate substitute word set into an initial pronoun resolution neural network. The initial pronoun resolution neural network respectively performs the feature extraction on the training context word set and the training candidate substitute word set, to obtain a first training feature and a second training feature; performs the positive-example iteration processing according to the first training feature and the second training feature, to obtain a corresponding positive-example training feature vector length; performs the negative-example iteration processing according to the first training feature and the second training feature, to obtain a corresponding negative-example training feature vector length; calculates a training substitute probability corresponding to each training candidate substitute word in the training candidate substitute word set according to the positive-example training feature vector length and the negative-example training feature vector length; calculates a training loss value according to the training substitute probability corresponding to the each training candidate substitute word and the corresponding standard training text tag; adjusts model parameters of the initial pronoun resolution neural network according to the training loss value until a convergence condition is satisfied, so as to obtain the pronoun resolution neural network. In one embodiment, the server 120 stores the pronoun resolution neural network locally, or transmits the pronoun resolution neural network to the terminal 110 for application by the terminal 110. A vector length may also be referred as a magnitude or a modulus length of the vector.

Figure 2:
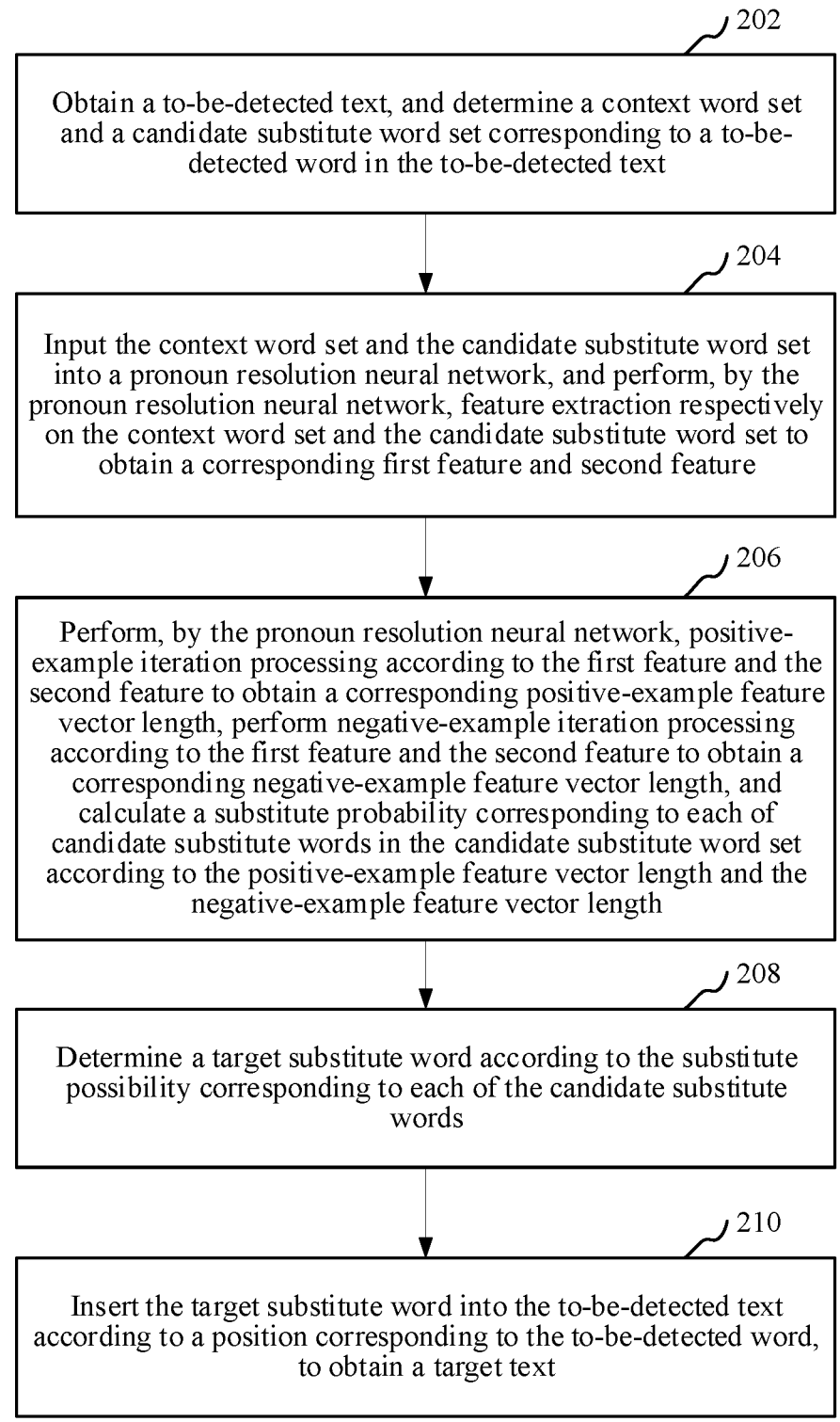
FIG. 2 is a schematic flowchart of a data processing method according to an embodiment.

As shown in FIG. 2, an embodiment provides a data processing method. In one embodiment, as an example, the method is applied to the terminal 110 or the server 120 in FIG. 1. Referring to FIG. 2, the data processing method includes the following operations:

Step 202. Obtain a to-be-detected text, and determine a context word set and a candidate substitute word set corresponding to a to-be-detected word in the to-be-detected text.

In one embodiment, the to-be-detected text is a text that needs the pronoun resolution. One or more to-be-detected texts may be used. The to-be-detected text may be obtained in real time or stored in advance. For instance, the to-be-detected text is obtained by using a web crawler to crawl in real time news information or forum posts when an instruction for the pronoun resolution is received. The to-be-detected text may also be stored in a database in advance. The pronoun resolution is to identify the substitute word referred to by the to-be-detected word in the to-be-detected text, the to-be-detected word being an omission or missing part in the to-be-detected text. For instance, the to-be-detected text is "Xiaoming ate an apple, & was very sweet", & representing the to-be-detected word.

In an embodiment, a preset object name may be stored, so that a text including the preset object name may be obtained as the to-be-detected text. For instance, object names such as "A company", "B product", and "C company" are stored in advance, and the text including one or more of "A company", "B product" and "C company" is obtained by using the web crawler to crawl the internet and used as the to-be-detected text.

In an embodiment, a data source corresponding to the to-be-detected text may be preset. For instance, in one embodiment of the present disclosure, the data source corresponding to the to-be-detected text is preset to be D website, E website, or F website, etc.

In an embodiment, the to-be-detected text may be obtained by further filtering text information. For instance, one or more of the titles, the abstract, the first paragraph, and the last paragraph of an article may be used as the to-be-detected text.

In one embodiment, the to-be-detected word in the to-be-detected text is the omission or missing part in the to-be-detected text. The context word set is a set of words including an ante-context word sequence and a post-context word sequence of the to-be-detected word. The ante-context word sequence of the to-be-detected word, when centered on the position of the to-be-detected word, is a sequence of words including forward words that come before the to-be-detected word. The post-context word sequence, when centered on the position of the to-be-detected word, is a sequence of words including backward words that come after the to-be-detected word. In a possible manner, an embodiment of the present disclosure first segments the to-be-detected text into words, performs syntactic analysis on the words to determine the position of the to-be-detected word, then obtains the forward words and the backward words according to the position of the to-be-detected word. The forward words constitute the ante-context word sequence, and the backward words constitute the post-context word sequence. The context word set is constituted by the ante-context word sequence and the post-context word sequence.

In one embodiment, the candidate substitute word set is a set of words including the candidate substitute words of the to-be-detected word. The candidate substitute word is used for substituting the to-be-detected word and may be a noun phrase. The candidate substitute word may be selected from words corresponding to the to-be-detected text based on a preset filtering rule. The preset filtering rule may be customized. For instance, noun phrases are obtained from the words corresponding to the to-be-detected text as the candidate substitute words; or, adjective phrases are obtained from the words corresponding to the to-be-detected text as the candidate substitute words, etc. In one embodiment, in an embodiment of the present disclosure, the to-be-detected text is segmented into words, the syntactic analysis is performed on the words to obtain the candidate substitute words according to the syntactic analysis result, and the obtained candidate substitute words constitute the candidate substitute word set. The syntactic analysis is to analyze grammatical functions of the words in the to-be-detected text, so as to obtain the syntactic analysis result. For instance, a sentence is "I came late", in which "I" is the subject, "came" is the predicate, and "late" is the complement.

In an embodiment, the obtained to-be-detected text is: " 小明吃了个小苹果，很甜，他心情超级美妙 (Xiaoming ate a small apple, very sweet, and he was in a super good mood)" First, the to-be-detected text is segmented into words: " 小明(Xiaoming)", " 吃了(ate)", " 个(a)", " 小苹果(small apple)", " 很甜(very sweet)", " 他(he)", " 心情(mood)", " 超级(super)", and " 美妙(good)". By performing the syntactic analysis on each of the words, the position of the to-be-detected word in the to-be-detected text is determined to be before "very sweet". Then, according to the position of the to-be-detected word, the ante-context word sequence is obtained as: "Xiaoming", "ate", "a", and "small apple"; and the post-context word sequence is obtained as: "very sweet", "he", "mood", "super", and "good". The context word set is constituted by the ante-context word sequence and the post-context word sequence. The preset filtering rule for obtaining the candidate substitute words is to filter the words corresponding to the to-be-detected text, to obtain the noun phrases as the candidate substitute words. Thus, the candidate substitute words obtained by the filtering process are: "Xiaoming" and "small apple". The candidate substitute word set is constituted by the candidate substitute words.

Step 204. Input the context word set and the candidate substitute word set into a pronoun resolution neural network.

The pronoun resolution neural network respectively performs the feature extraction on the context word set and the candidate substitute word set, to obtain a corresponding first and second feature.

In one embodiment, the pronoun resolution is to detect the substitute word referred to by the to-be-detected word in the to-be-detected text, the to-be-detected word being the omission or missing part in the to-be-detected text. The pronoun resolution neural network is used for determining the candidate substitute word corresponding to the to-be-detected word. The pronoun resolution neural network is pre-trained. The pronoun resolution neural network may be a capsule network or a support vector machine (SVM) classifier, such as an artificial neural network (ANN) classifier, and a logistic regression algorithm (LR) classifier, etc. The pronoun resolution neural network fuses the features corresponding to the word sequence and the character sequence corresponding to the word sequence, to obtain the substitute probability corresponding to each candidate substitute word for substituting the to-be-detected word, thereby improving the accuracy of the pronoun resolution. Before inputting the context word set and the candidate substitute word set into the pronoun resolution neural network, the pronoun resolution neural network needs to be trained using training samples, in order to determine the model parameters. As such, the model is able to determine the substitute probability corresponding to each candidate substitute word for substituting the to-be-detected word from the inputted to-be-detected text. In one embodiment, the embodiment of the present disclosure uses a supervised learning manner during the training.

In one embodiment, the feature extraction refers to mapping one or more inputted features to other features. For instance, after inputting the context word set and the candidate substitute word set into the pronoun resolution neural network, the pronoun resolution neural network may perform the feature extraction on the context word set using a feature representation sub-network, to obtain the first feature corresponding to the context word set; and perform the feature extraction on the candidate substitute word set using a feature representation sub-network, to obtain the second feature corresponding to the candidate substitute word set.

In one embodiment, the first feature includes but is not limited to a word vector feature basing on the word sequence in the context word set and a character vector feature basing on the character sequence corresponding to the word sequence in the context word set. The second feature includes but is not limited to a word vector feature basing on the word sequence in the candidate substitute word set and a character vector feature basing on the character sequence corresponding to the word sequence in the candidate substitute word set. Basing on the word sequence in the context word set or in the candidate substitute word set refers to performing the feature extraction on the word sequence in the context word set or in the candidate substitute word set, so as to obtain the corresponding word vector feature. The feature extraction performed on the word sequence refers to performing the extraction on the word vector as a whole.

Basing on the character sequence corresponding to the word sequence in the context word set or in the candidate substitute word set refers to performing the feature extraction on the character sequence corresponding to the word sequence in the context word set or in the candidate substitute word set, so as to obtain the corresponding word vector feature. The feature extraction performed on the character sequence corresponding to the word sequence refers to performing the extraction on the character vector as a whole.

In an embodiment, the context word set and the candidate substitute word set are input into the pronoun resolution neural network. The pronoun resolution neural network includes a forward feature representation sub-network, a reverse feature representation sub-network, and a character vector feature representation sub-network. The pronoun resolution neural network performs the feature extraction on the word sequence in the context word set using the forward feature representation sub-network, to obtain a corresponding first forward sub-feature; performs the feature extraction on the word sequence in the context word set using the reverse feature representation sub-network, to obtain a corresponding first reverse sub-feature; and performs the feature extraction on the character sequence corresponding to the word sequence in the context word set using the character vector feature representation sub-network, to obtain a corresponding first character vector sub-feature. The first forward sub-feature, the first reverse sub-feature, and the first character vector sub-feature constitute the first feature corresponding to the context word set.

Similarly, the pronoun resolution neural network performs the feature extraction on the word sequence in the candidate substitute word set using the forward feature representation sub-network, to obtain a corresponding second forward sub-feature; performs the feature extraction on the word sequence in the candidate substitute word set using the reverse feature representation sub-network, to obtain a corresponding second reverse sub-feature; and performs the feature extraction on the character sequence corresponding to the word sequence in the candidate substitute word set using the character vector feature representation sub-network, to obtain a corresponding second character vector sub-feature. The second forward sub-feature, the second reverse sub-feature, and the second character vector sub-feature constitute the second feature corresponding to the candidate substitute word set.

Step 206. The pronoun resolution neural network performs the positive-example iteration processing according to the first feature and the second feature, to obtain a corresponding positive-example feature vector length; performs the negative-example iteration processing according to the first feature and the second feature, to obtain a corresponding negative-example feature vector length; and calculates a substitute probability corresponding to the each candidate substitute word in the candidate substitute word set according to the positive-example feature vector length and the negative-example feature vector length.

In one embodiment, the positive-example iteration processing refers to a process of repeatedly performing the iterative calculation on the features to obtain the positive-example feature vector length. The positive-example feature vector length refers to a length of the positive-example feature vector. The positive-example feature vector is a feature vector corresponding to the positive-example substitute probability. The positive-example substitute probability corresponding to each candidate substitute word is the probability that the to-be-detected word in the training text matches the candidate substitute word. The positive-example iteration processing may be an iterative calculation process in which the customized dynamic routing algorithm is used to obtain the positive-example training feature vector length. The customized dynamic routing algorithm may be used for the positive-example iteration processing and the negative-example iteration processing. Since the positive-example iteration processing and the negative-example iteration processing correspond to different preset weight coefficients, the positive-example feature vector length and the negative-example feature vector length are respectively obtained by performing the calculation on the first training feature and the second training feature using the customized dynamic routing algorithm.

The negative-example iteration processing refers to a process of repeatedly performing the iterative calculation on the features to obtain the negative-example feature vector length. The negative-example feature vector length refers to a length of the negative-example feature vector. The negative-example feature vector is a feature vector corresponding to the negative-example substitute probability. The negative-example substitute probability corresponding to each candidate substitute word refers to the probability that the to-be-detected word in the to-be-detected text mismatches the candidate substitute word.

In one embodiment, using the customized dynamic routing algorithm to calculate the positive-example feature vector length and the negative-example feature vector length may be performed as: calculating an initial iteration center according to the first feature and the second feature as an initial iteration center of the positive-example iteration processing and the negative-example iteration processing; using the initial iteration center as the current iteration center; linearly transforming the first feature and the second feature according to the preset weight coefficients corresponding to the positive-example and negative-example iteration processing, to obtain the first intermediate features and the second intermediate features corresponding to the positive-example iteration processing and the negative-example iteration processing; respectively calculating similarities between the first intermediate features corresponding to the positive-example iteration processing and the negative-example iteration processing and the current iteration center, and similarities between the second intermediate features corresponding to the positive-example iteration processing and the negative-example iteration processing and the current iteration center, to obtain the first similarities and the second similarities corresponding to the positive-example iteration processing and the negative-example iteration processing; normalizing the first similarities and the second similarities corresponding to the positive-example iteration processing and the negative-example iteration processing, to obtain the first intermediate similarities and the second intermediate similarities corresponding to the positive-example iteration processing and the negative-example iteration processing; and calculating the initial feature vector lengths corresponding to the positive-example iteration processing and the negative-example iteration processing according to the first intermediate similarities and the second intermediate similarities corresponding to the positive-example iteration processing and the negative-example iteration processing, and the corresponding first intermediate features and the second intermediate features.

Then, the iteration centers are updated according to the first intermediate similarities and the second intermediate similarities corresponding to the positive-example iteration processing and the negative-example iteration processing, and the initial iteration center; the updated iteration centers are used as the current iteration centers; and the operation of respectively calculating similarities between the first intermediate features corresponding to the positive-example iteration processing and the negative-example iteration processing and the current iteration center and similarities between the second intermediate features corresponding to the positive-example iteration processing and the negative-example iteration processing and the current iteration center is performed until the convergence condition is satisfied, so as to obtain the positive-example feature vector length corresponding to the positive-example iteration processing and the negative-example feature vector length corresponding to the negative-example iteration processing. In one embodiment, the convergence condition may be customized. For instance, if the number of iterations reaches a preset number, or if the initial feature vector length no longer changes, then the convergence condition is considered to be satisfied.

The substitute probability refers to the possibility that each candidate substitute word in the candidate substitute word set can substitute the to-be-detected word. The substitute probability may be a percentage probability, or a score value, etc. After performing the positive-example iteration processing and the negative-example iteration processing on the first feature and the second feature to obtain the positive-example feature vector length and the negative-example feature vector length, the substitute probability corresponding to each candidate substitute word in the candidate substitute word set is calculated according to the positive-example feature vector length and the negative-example feature vector length. The substitute probability includes but is not limited to the positive-example substitute probability and the negative-example substitute probability. The so-called positive-example substitute probability corresponding to each candidate substitute word in the candidate substitute word set refers to the substitute probability that the candidate substitute word can substitute the to-be-detected word. The negative-example substitute probability corresponding to each candidate substitute word in the candidate substitute word set refers to the substitute probability that the candidate substitute word cannot substitute the to-be-detected word.

The calculation of the substitute probability corresponding to each candidate substitute word in the candidate substitute word set according to the positive-example feature vector length and the negative-example feature vector length may be defined by the following equations:

$$p_{pos} = \frac{e^{\|v_{neg}\|}}{e^{\|v_{neg}\|} + e^{\|v_{pos}\|}}$$

$$p_{neg} = \frac{e^{\|v_{pos}\|}}{e^{\|v_{neg}\|} + e^{\|v_{pos}\|}}$$

Where, $P_{pos}$ denotes the positive-example substitute probability, $P_{neg}$ denotes the negative-example substitute probability, $V_{pos}$ denotes the positive-example feature vector length, and $V_{neg}$ denotes the negative-example feature vector length.

Step 208. Determine a target substitute word according to the substitute probability corresponding to the each candidate substitute word.

The target substitute word refers to the substitute word in the candidate word set that can substitute the to-be-detected word in the to-be-detected text. In one embodiment, after calculating the substitute probability corresponding to each candidate substitute word in the candidate substitute word set according to the positive-example feature vector length and the negative-example feature vector length, the target substitute word may be determined according to the substitute probability corresponding to each candidate substitute word based on a preset rule. The preset rule may be customized. For instance, the candidate substitute word with the highest substitute probability is determined as the target substitute word. Alternatively or additionally, when the substitute probability corresponding to each candidate substitute word includes the positive-example substitute probability and the negative-example substitute probability, the positive-example substitute probability corresponding to each candidate substitute word in the candidate substitute word set referring to the substitute probability that the candidate substitute word can substitute the to-be-detected word, and the negative-example substitute probability corresponding to each candidate substitute word in the candidate substitute word set referring to the substitute probability that the candidate substitute word cannot substitute the to-be-detected word, then the target substitute word is determined from the candidate substitute word set according to the positive-example substitute possibilities, for instance, determining the candidate substitute word with the highest positive-example substitute probability as the target substitute word.

In an embodiment, the substitute probability corresponding to each candidate substitute word includes the positive-example substitute probability and the negative-example substitute probability. Assume that the candidate substitute word set includes word a, word b, and word c. The positive-example substitute probability corresponding to word a is 0.7, and the negative-example substitute probability corresponding to word a is 0.3; the positive-example substitute probability corresponding to word b is 0.8, and the negative-example substitute probability corresponding to word b is 0.2; the positive-example substitute probability corresponding to word c is 0.4, and the negative-example substitute probability corresponding to word c is 0.6. The rule for determining the target substitute word according to the substitute probabilities corresponding to the candidate substitute words is to take the candidate substitute word with the highest positive-example substitute probability as the target substitute word. Thus, the target substitute word is word b.

Step 210. Insert the target substitute word into the to-be-detected text according to the position corresponding to the to-be-detected word, to obtain a target text.

The insertion refers to writing or putting the target substitute word at the position corresponding to the to-be-detected word in the to-be-detected text. In one embodiment, after determining the target substitute word according to the substitute probability corresponding to each candidate substitute word, the position of the to-be-detected word in the to-be-detected text is determined, and the target substitute word is inserted at the position of the to-be-detected word, thereby obtaining the target text. The determination of the position of the to-be-detected word in the to-be-detected text may be conducted by segmenting the to-be-detected text into words, performing the syntactic analysis on the words to obtain the syntactic analysis result, and determining the position of the to-be-detected word in the to-be-detected text according to the syntactic analysis result.

In an embodiment, the to-be-detected text is: "Xiaoming ate a small apple, very sweet". The embodiment of the present disclosure determines the target substitute word from the candidate substitute word set to be: "small apple". First, the position of the to-be-detected word in the to-be-detected text is determined to be before "very sweet". Then, the target substitute word is inserted at the position corresponding to the to-be-detected word. Finally, the target text is obtained as is: "Xiaoming ate a small apple, the small apple was very sweet".

In accordance with the above data processing method, the pronoun resolution neural network can make good use of the features corresponding to the context word sequence and the candidate substitute words in the to-be-detected text. By performing the positive-example iteration processing and the negative-example iteration processing on the features corresponding to the context word sequence and the candidate substitute words, the positive-example feature vector length and the negative-example feature vector length are obtained, and finally the substitute probability corresponding to each the candidate substitute word in the candidate substitute word set is calculated according to the positive-example feature vector length and the negative-example feature vector length. The pronoun resolution neural network well fuses the features corresponding to the context word sequence and the candidate substitute words, in order to calculate the substitute probabilities corresponding to the candidate substitute words according to the features corresponding to the context word sequence and the candidate substitute words, the features including not only those of the word sequence but also the features of the character sequence corresponding to the word sequence. Thus, it can resolve the data sparseness problem, so as to improve the accuracy of the substitute probability corresponding to each candidate substitute word in the candidate substitute word set, thereby enhancing the accuracy of the pronoun resolution.

In an embodiment, after the pronoun resolution neural network performs the feature extraction on the context word set and the candidate substitute word set, to obtain the corresponding first and second feature, the data processing method further includes: the pronoun resolution neural network performs dimensional transformation and length scaling processing on the first feature and the second feature, to obtain a first target feature and a second target feature.

There exists dimension diversity and length diversity between the first feature and the second feature, that is, the dimensions and lengths of the first feature and the second feature are not uniform. Thus, after the pronoun resolution neural network performs the feature extraction on the context word set and the candidate substitute word set to obtain the first feature and the second feature, it is necessary to perform the dimensional transformation and length scaling processing on the first feature and the second feature for the purpose of the calculation accuracy of the positive-example feature vector length and the negative-example feature vector length. By this way, the dimension and length diversity between the first feature and the second feature can be avoided, thereby ensuring the accuracy of the subsequent calculation of the positive-example feature vector length and the negative-example feature vector length.

The first target feature refers to the first feature after the dimensional transformation and length scaling processing, and the second target feature refers to the second feature after the dimensional transformation and length scaling processing. In one embodiment, after the pronoun resolution neural network obtains the first feature and the second feature, a feature transformation and combination sub-network in the pronoun resolution neural network may be used to perform the dimensional transformation and length scaling processing on the first feature and the second feature, to obtain the first target feature and the second target feature. Specifically, first, the dimensional scaling processing is performed on the first feature and the second feature by using a linear transformation function, to obtain corresponding intermediate features; then, the length scaling processing is performed on the corresponding intermediate features by using a length scaling function, to obtain the first target feature corresponding to the first feature and the second target feature corresponding to the second feature. The dimensions of the first feature and the second feature are scaled by using the linear transformation function, so as to obtain the corresponding intermediate features. The dimensional scaling processing may be defined by the following equation:

$$u_i = \text{squash}(w_i * f_i + b_i)$$

Where, $w_i$ is the preset weight coefficient corresponding to the first feature or the second feature, $f_i$ is the first feature or the second feature, $b_i$ is a bias parameter obtained by training, the squash function is a squash function configured for mapping a larger inputted value to a smaller interval 0~1, and $u_i$ is the intermediate feature corresponding to the first feature or the second feature.

The lengths of the corresponding intermediate features are scaled by using the length scaling function, so as to obtain the first target feature corresponding to the first feature, and the second target feature corresponding to the second feature. The length scaling processing may be defined by the following equation:

$$\text{squash}(u_i) = \frac{\|u_i\|^2}{1 + \|u_i\|^2} * \frac{u_i}{\|u_i\|}$$

Where, the squash function is a squash function, and $u_i$ is the intermediate feature corresponding to the first feature or the second feature.

In one embodiment, the pronoun resolution neural network performs the positive-example iteration processing according to the first feature and the second feature, to obtain the corresponding positive-example feature vector length; and performs the negative-example iteration processing according to the first feature and the second feature, to obtain the corresponding negative-example feature vector length, including: the pronoun resolution neural network performs the positive-example iteration processing according to the first target feature and the second target feature, to obtain the corresponding positive-example feature vector length; and performs the negative-example iteration processing according to the first target feature and the second target feature, to obtain the corresponding negative-example feature vector length.

After performing the dimensional transformation and length scaling processing on the first feature and the second feature to obtain the corresponding first target feature and second target feature, the pronoun resolution neural network performs the positive-example iteration processing according to the first target feature and the second target feature, to obtain the corresponding positive-example feature vector length; and performs the negative-example iteration processing according to the first target feature and the second target feature, to obtain the corresponding negative-example feature vector length. The specific process may refer to the operation of performing the positive-example iteration processing according to the first feature and the second feature, to obtain the corresponding positive-example feature vector length; and performing the negative-example iteration processing according to the first feature and the second feature, to obtain the corresponding negative-example feature vector length. Thus, it will not be described herein.

Figure 3:
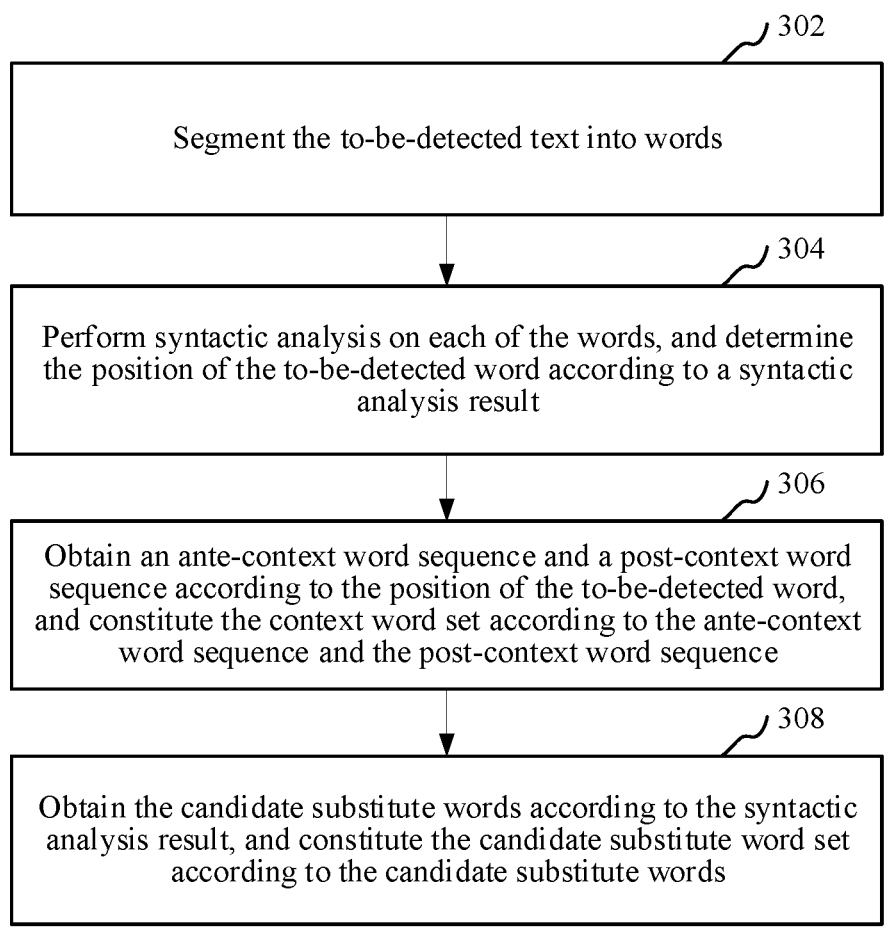
FIG. 3 is a schematic flowchart of determining a context word set and a candidate substitute word set corresponding to a to-be-detected word in a to-be-detected text according to an embodiment.

In an embodiment, as shown in FIG. 3, the determination of the context word set and the candidate substitute word set corresponding to the to-be-detected word in the to-be-detected text includes:

Step 302. Segment the to-be-detected text into words.

Since the to-be-detected text is typically a comment or an article in the form of sentences, it is necessary to segment the to-be-detected text to obtain segmented words. The segmentation refers to dividing a piece of text data into words. The segmentation manner may be set according to actual needs. For instance, one or more of segmentation manners, including a segmentation manner based on string matching, a segmentation manner based on understanding, or a segmentation manner based on statistics, may be used. Alternatively or additionally, segmentation tools, such as a Jieba segmentation tool, or a Hanlp segmentation tool, etc., may be used for segmenting the to-be-detected text. The word sequence arranged in sequence according to the order of the words in the to-be-detected text is obtained after the segmentation processing.

Step 304. Perform the syntactic analysis on each of the words, and determine the position of the to-be-detected word according to a syntactic analysis result.

The syntactic analysis is to analyze the grammatical functions of the segmented words in the to-be-detected text, so as to obtain the syntactic analysis result. The syntactic analysis structure may be a syntactic structure. The syntactic structure refers to the combination of words according to certain rules. For instance, a sentence is "I came late", in which "I" is the subject, "came" is the predicate, and "late" is the complement. Accordingly, the corresponding syntactic structure is: subject+predicate+object. For another instance, a sentence is "Xiaoming ate a small apple, very sweet", and accordingly the corresponding syntactic structure is: noun phrase+verb phrase+quantifier+noun phrase+to-be-detected word+adjective phrase.

In one embodiment, after performing the syntactic analysis on each of the words, the position of the to-be-detected word is determined according to the syntactic analysis result. Since the to-be-detected word is the omission or missing part in the to-be-detected text, the position of the to-be-detected word can be detected according to the syntactic analysis result obtained by performing the syntactic analysis on each of the words. For instance, the to-be-detected text is: "Xiaoming ate a small apple, very sweet". The segmented words are: "Xiaoming", "ate", "a", "small apple", and "very sweet", and the syntactic analysis result obtained by performing the syntactic analysis on the segmented words is: noun phrase+verb phrase+quantifier+noun phrase+to-be-detected word+adjective phrase. Hence, the position of the to-be-detected word in the to-be-detected text is determined to be before "very sweet", that is, some content is omitted or missing before "very sweet".

Step 306. Obtain the ante-context word sequence and the post-context word sequence according to the position of the to-be-detected word, and form the context word set from the ante-context word sequence and the post-context word sequence.

The ante-context word sequence of the to-be-detected word, when centered on the to-be-detected word, is a sequence of words including the forward words that come before the to-be-detected word. The post-context word sequence, when centered on the to-be-detected word, is a sequence of words including the backward words that come after the to-be-detected word. In one embodiment, after determining the position of the to-be-detected word according to the syntactic analysis result, centered on the position of the to-be-detected word, the ante-context word sequence including the forward words that come before the to-be-detected word is obtained, and the post-context word sequence including the backward words that come after the to-be-detected word is obtained. The context word set is constituted by the ante-context word sequence and the post-context word sequence.

For instance, the to-be-detected text is: "小明吃了个小苹果 很甜 他心情超级美妙 (Xiaoming ate a small apple, very sweet, and he was in a super good mood)" First, the to-be-detected text is segmented into words: "小明(Xiaoming)", "吃了(ate)", "个(a)", "小苹果(small apple)", "很甜(very sweet)", "他(he)", "心情(mood)", "超级(super)", and "美妙(good)". The syntactic analysis is performed on each word, and the position of the to-be-detected word in the to-be-detected text is determined to be before "very sweet". Then, according to the position of the to-be-detected word, the ante-context word sequence is obtained as: "Xiaoming", "ate", "a", and "small apple", and the post-context word sequence is obtained as: "very sweet", "he", "mood", "super", and "good". The context word set is constituted by the ante-context word sequence and the post-context word sequence.

Step 308. Obtain the candidate substitute words according to the syntactic analysis result, and form the candidate substitute word set from the candidate substitute words.

The candidate substitute words are used for substituting the to-be-detected word and may be noun phrases, etc. In one embodiment, after performing the syntactic analysis on the segmented words to obtain the syntactic analysis result, the candidate substitute words are obtained according to the syntactic analysis result based on the preset filtering rule. The preset filtering rule may be customized, for instance, the noun phrases are used as the candidate substitute words based on the syntactic structure, or the adjectives are used as the candidate substitute words based on the syntactic structure, etc. In one embodiment, after obtaining the candidate substitute words from the segmented words based on the preset filtering rule, the candidate substitute word set is constituted according to the candidate substitute words.

For instance, the to-be-detected text is: "小明吃了个小苹果，很甜，他心情超级美妙(Xiaoming ate a small apple, very sweet, and he was in a super good mood)" First, the to-be-detected text is segmented into words: "小明(Xiaoming)", "吃了(ate)", "个(a)", "小苹果(small apple)", "很甜(very sweet)", "他(he)", "心情(mood)", "超级(super)", and "美妙(good)". The preset filtering rule for obtaining the candidate substitute words is to filter the words corresponding to the to-be-detected text to obtain the noun phrases as the candidate substitute words. Accordingly, the obtained candidate substitute words are: "Xiaoming" and "small apple". The candidate substitute word set is constituted by the candidate substitute words.

Figure 4:
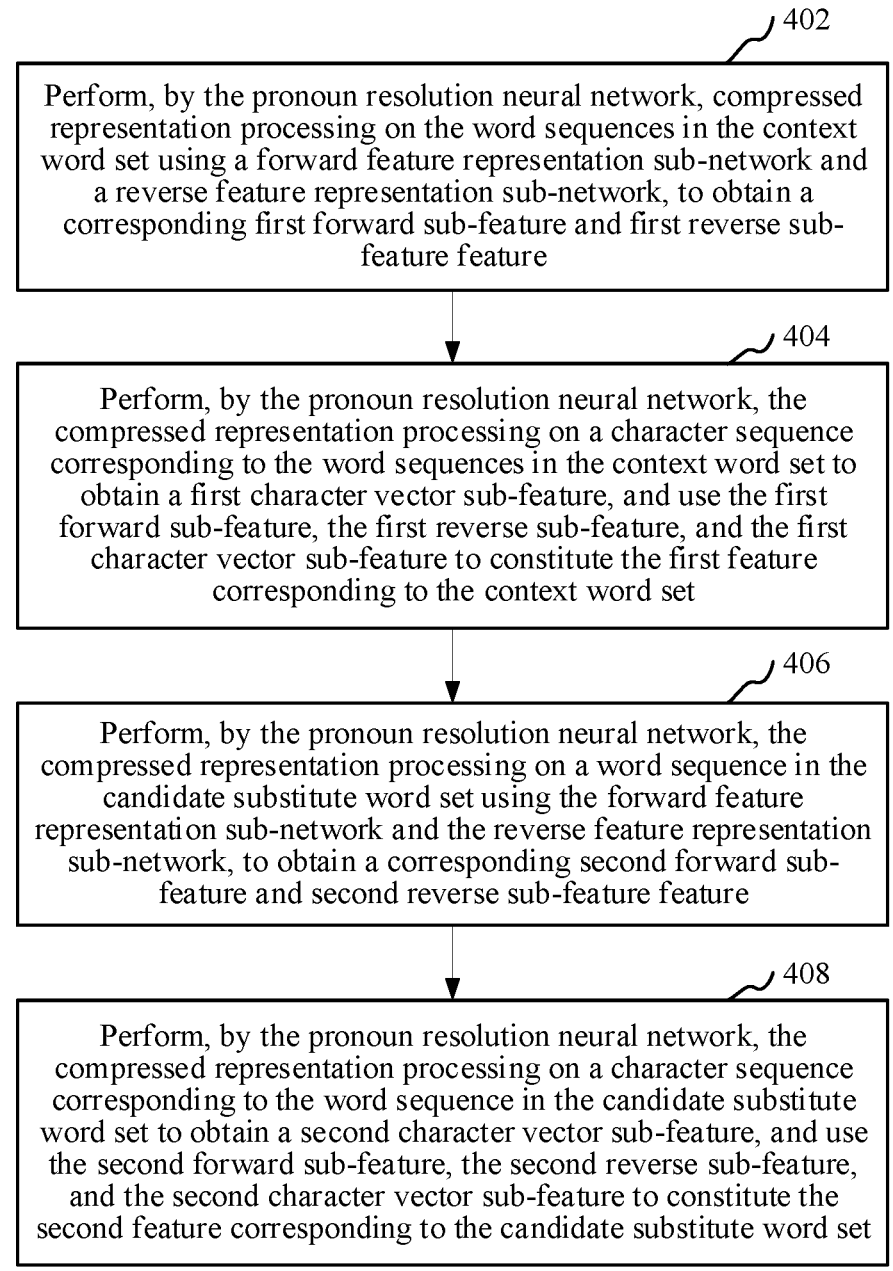
FIG. 4 is a schematic flowchart of a pronoun resolution neural network performing feature extraction according to an embodiment.

In an embodiment, as shown in FIG. 4, the pronoun resolution neural network performs the feature extraction on the context word set and the candidate substitute word set to obtain the corresponding first and second feature, including:

Step 402. The pronoun resolution neural network performs the compressed representation processing on the word sequence in the context word set using the forward feature representation sub-network and the reverse feature representation sub-network, to obtain the corresponding first forward sub-feature and first reverse sub-feature.

The forward feature representation sub-network and the reverse feature representation sub-network are both used for performing the feature calculation on the word sequence, so as to obtain the corresponding forward sub-feature and reverse sub-feature. The compressed representation is a process of performing the feature calculation on the word sequence, so as to obtain the corresponding sub-feature. The forward feature representation sub-network and the reverse feature representation sub-network may be two long short-term memory (LSTM) neural sub-networks.

In one embodiment, the pronoun resolution neural network performs the feature extraction on the ante-context word sequence in the context word set using the forward feature representation sub-network, so as to obtain the first forward sub-feature corresponding to the ante-context word sequence; and performs the feature extraction on the post-context word sequence in the context word set using the reverse feature representation sub-network, so as to obtain the first reverse sub-feature corresponding to the post-context word sequence.

Step 404. The pronoun resolution neural network performs the compressed representation processing on the character sequence corresponding to the word sequence in the context word set, to obtain the first character vector sub-feature. The first forward sub-feature, the first reverse sub-feature, and the first character vector feature constitute the first feature corresponding to the context word set.

The pronoun resolution neural network further includes a character vector feature representation sub-network, which is used for performing the feature extraction on the character sequence corresponding to the word sequence. The pronoun resolution neural network performs the feature extraction on the character sequence corresponding to the word sequence in the context word set using the character vector feature representation sub-network, so as to obtain the corresponding first character vector sub-feature.

In one embodiment, the pronoun resolution neural network performs the feature extraction on the ante-context word sequence in the context word set using the character vector feature representation sub-network, so as to obtain a character vector sub-feature corresponding to the ante-context word sequence; and performs the feature extraction on the post-context word sequence in the context word set using the character vector feature representation sub-network, so as to obtain a character vector sub-feature corresponding to the post-context word sequence. The character vector sub-feature corresponding to the ante-context word sequence and the character vector sub-feature corresponding to the post-context word sequence constitute the first character vector sub-feature.

In one embodiment, the first forward sub-feature, the first reverse sub-feature, and the first character vector sub-feature constitute the first feature corresponding to the context word set. These sub-features may be defined by the following equations:

$$f^0 = \text{LSTM}_{forward}(zp\_pre\_words_{[0:N]})$$

$$f^1 = \text{LSTM}_{reverse}(zp\_pre\_words_{[0:N]})$$

$$f^2 = \text{BERT}(zp\_pre\_chars_{[0:M]})$$

Where, $f^0$ is the first forward sub-feature, $f^1$ is the first reverse sub-feature, $f^2$ is the first character vector sub-feature, $\text{LSTM}_{forward}$ is the forward feature representation sub-network, $\text{LSTM}_{reverse}$ is the reverse feature representation sub-network, BERT is the character vector feature representation sub-network zp_pre_word, is the word sequence in the context word set, zp_pre_chars is character sequences corresponding to the word sequence in the context word set, N is the number of words corresponding to the word sequence in the context word set, and M is the number of the character sequences corresponding to the word sequence in the context word set.

Step 406. The pronoun resolution neural network performs the compressed representation processing on the word sequence in the candidate substitute word set using the forward feature representation sub-network and the reverse feature representation sub-network, to obtain the corresponding second forward sub-feature and second reverse sub-feature.

In one embodiment, the pronoun resolution neural network performs the feature extraction on the candidate substitute words in the candidate substitute word set using the forward feature representation sub-network, so as to obtain the second forward sub-feature corresponding to the candidate substitute words; and performs the feature extraction on the candidate substitute words in the candidate substitute word set using the reverse feature representation sub-network, so as to obtain the second reverse sub-feature corresponding to the candidate substitute words.

Step 408. The pronoun resolution neural network performs the compressed representation processing on the character sequence corresponding to the word sequence in the candidate substitute word set, to obtain the second character vector sub-feature. The second forward sub-feature, the second reverser sub-feature, and the second character vector sub-feature constitute the second feature corresponding to the candidate substitute word set.

In one embodiment, the pronoun resolution neural network includes the character vector feature representation sub-network, which is used for performing the feature extraction on the character sequence corresponding to the word sequence. Accordingly, the pronoun resolution neural network performs the feature extraction on the character sequence corresponding to the candidate substitute words in the candidate substitute word set using the character vector feature representation sub-network, so as to obtain the second character vector sub-feature corresponding to the candidate substitute words. In one embodiment, the second forward sub-feature, the second reverse sub-feature, and the second character vector sub-feature constitute the second feature corresponding to the candidate substitute word set.

Figure 5:
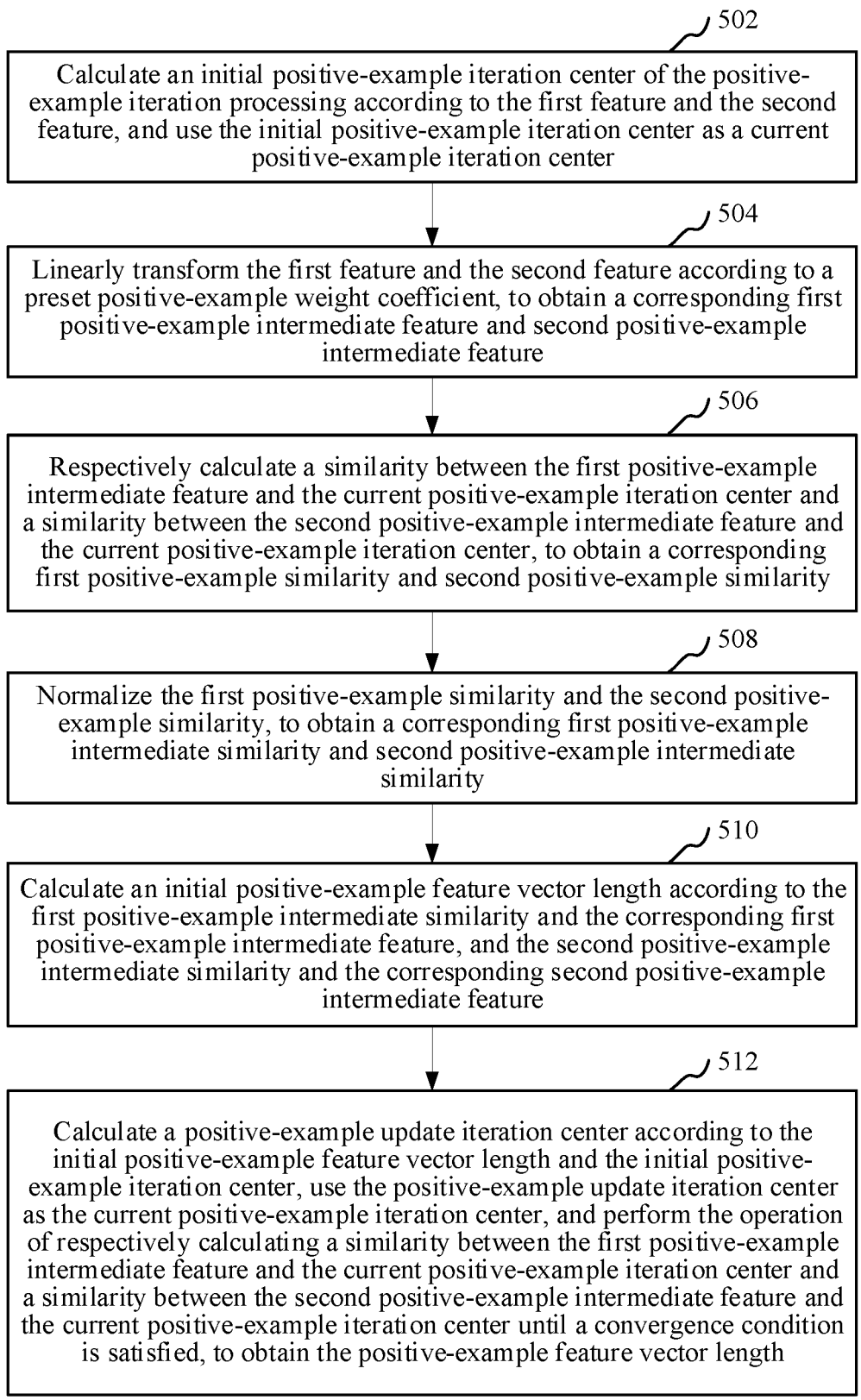
FIG. 5 is a schematic flowchart of positive-example iteration processing according to an embodiment.

In an embodiment, as shown in FIG. 5, the pronoun resolution neural network performs the positive-example iteration processing according to the first feature and the second feature to obtain the corresponding positive-example feature vector length, including:

Step 502. Calculate an initial positive-example iteration center of the positive-example iteration processing according to the first feature and the second feature, and use the initial positive-example iteration center as a current positive-example iteration center.

After obtaining the first feature and the second feature, the pronoun resolution neural network needs to perform the positive-example iteration processing on the first feature and the second feature. First, the initial positive-example iteration center of the positive-example iteration processing is obtained as the current positive-example iteration center. Herein, the current positive-example iteration center is a reference center for the positive-example iteration processing. Specifically, the initial positive-example iteration center may be calculated according to the first feature and the second feature. The calculation means may be customized, for instance, calculating a weighted sum of the first feature and the second feature as the initial positive-example iteration center; or, calculating a mean value of the first feature and the second feature as the initial positive-example iteration center, etc.

In an embodiment, as shown in FIG. 6, FIG. 6 is a schematic diagram of coding of the positive-example iteration processing or the negative-example iteration processing according to an embodiment. During the positive-example iteration processing, FIG. 6 is a schematic diagram of coding of the positive-example iteration processing according to an embodiment. As shown in FIG. 6, $u_i$ denotes the first feature or the second feature, and $k_j$ denotes the current positive-example iteration center. The initial positive-example iteration center shown in FIG. 6 is obtained by calculating the weighted sum of the first feature and the second feature, and then using the tan h function to transform the weighted sum. Specifically, the initial positive-example iteration center may be calculated by the following equation:

$$k_j = \tanh\left(\sum\nolimits_i^l u_i\right)$$

Where, l denotes the total number of the first feature and the second feature, $u_i$ denotes the first feature or the second feature, and $k_j$ denotes the initial positive-example iteration center.

Step 504. Linearly transforming the first feature and the second feature according to a preset positive-example weight coefficient, to obtain a first positive-example intermediate feature and a second positive-example intermediate feature.

The preset positive-example weight coefficient herein is a weight coefficient used for the linear transformation of the first feature and the second feature during the positive-example iteration processing. The preset positive-example weight coefficient is obtained by the training of the pronoun resolution neural network. That is, the weight coefficients used for the linear transformation of the first feature and the second feature during the positive-example iteration processing are both the preset positive-example weight coefficient.

In one embodiment, the first feature and the second feature are respectively linearly transformed according to the preset positive-example weight coefficient, so as to obtain the corresponding first positive-example intermediate feature and second positive-example intermediate feature. Specifically, the linear transformation may be performed by calculating the product of the preset positive-example weight coefficient and the first feature to obtain the first positive-example intermediate feature, and calculating the product of the preset positive-example weight coefficient and the second feature to obtain the second positive-example intermediate feature.

In an embodiment, as shown in FIG. 6, $u_i$ denotes the first feature or the second feature;

$\hat{u}_{j|i}$ denotes the positive-example intermediate feature corresponding to $u_i$; if $u_i$ is the first feature, $\hat{u}_{j|i}$ is the first positive-example intermediate feature; and if $u_i$ is the second feature, $\hat{u}_{j|i}$ is the second positive-example intermediate feature; and $\hat{w}_{j|i}$ is the preset positive-example weight coefficient for the positive-example iteration processing. Specifically, the linear transformation of the first feature and the second feature may be defined by the following equation:

$$\hat{u}_{j|i} = \hat{w}_{j|i} * u_i$$

Step 506. Respectively calculate a similarity between the first positive-example intermediate feature and the current positive-example iteration center and a similarity between the second positive-example intermediate feature and the current positive-example iteration center, to obtain a first positive-example similarity and a second positive-example similarity.

The similarity is a measurement to comprehensively evaluate how close two objects are. The similarity herein is to evaluate how close the positive-example intermediate feature and the current positive-example iteration center are. The higher the similarity is, the closer the positive-example intermediate feature and the current positive-example iteration center are. Otherwise, the positive-example intermediate feature is not similar to the current positive-example iteration center. In one embodiment, after obtaining the first positive-example intermediate feature and the second positive-example intermediate feature, the similarity between the first positive-example intermediate feature and the current positive-example iteration center, and the similarity between the second positive-example intermediate feature and the current positive-example iteration center are respectively calculated, so as to obtain the first positive-example similarity and the second positive-example similarity. The means for calculating the similarity may be customized, including but not limited to, a means of using Euclidean distance, cosine similarity, etc.

In an embodiment, as shown in FIG. 6, $\hat{u}_{j|i}$ denotes the positive-example intermediate feature corresponding to $u_i$, $k_j$ denotes the current positive-example iteration center, and $\partial_{ij}$ denotes the positive-example similarity. If $\hat{u}_{j|i}$ denotes the first positive-example intermediate feature, $\partial_{ij}$ denotes the first positive-example similarity; and if $\hat{u}_{j|i}$ denotes the second positive-example intermediate feature, $\partial_{ij}$ denotes the second positive-example similarity. Specifically, the positive-example similarity may be calculated by the following equation:

$$\partial_{ij} = \hat{u}_{j|i} * k_j$$

Step 508. Normalize the first positive-example similarity and the second positive-example similarity, to obtain a first positive-example intermediate similarity and a second positive-example intermediate similarity.

The normalization is a way to simplify calculations. That is, a dimensional expression is transformed into a dimensionless expression and becomes a scalar. For instance, the positive-example similarity is transformed into a decimal between (0,1), or transformed to 0 or 1. The means for normalizing the first positive-example similarity and the second positive-example similarity may include, but not limited to, a means of using the softmax function (also known as normalized exponential function).

In an embodiment, as shown in FIG. 6, $c_j$ is the positive-example intermediate similarity obtained after the normalization, $\partial_j$ is the first positive-example similarity and the second positive-example similarity. If $\partial_j$ is the first positive-example similarity, $c_j$ is the first positive-example intermediate similarity; and if $\partial_j$ is the second positive-example similarity, $c_j$ is the second positive-example intermediate similarity. Specifically, the positive-example intermediate similarity may be calculated by the following equation:

$$c_j = \text{soft max}(\partial_j)$$

Step 510. Calculate an initial positive-example feature vector length according to the first positive-example intermediate similarity and the corresponding first positive-example intermediate feature, the second positive-example intermediate similarity and the corresponding second positive-example intermediate feature.

The initial positive-example feature vector length refers to the positive-example feature vector length of the first positive-example iteration. Specifically, the initial positive-example feature vector length may be calculated according to the first positive-example intermediate similarity and the corresponding first positive-example intermediate feature, and the second positive-example intermediate similarity and the corresponding second positive-example intermediate feature. The calculation means may be customized, for instance, calculating a sum of the first positive-example intermediate similarity and the corresponding first positive-example intermediate feature, and the second positive-example intermediate similarity and the corresponding second positive-example intermediate feature as the initial positive-example feature vector length; or, calculating a mean value of the first positive-example intermediate similarity and the corresponding first positive-example intermediate feature, and the second positive-example intermediate similarity and the corresponding second positive-example intermediate feature as the initial positive-example feature vector length.

In an embodiment, as shown in FIG. 6, $v_j$ denotes the positive-example feature vector length, $c_{ij}$ denotes the positive-example intermediate similarity, $$\hat{u}_{j|i}$$

denotes the positive-example intermediate feature. If $c_{ij}$ denotes the first positive-example intermediate similarity, $$\hat{u}_{j|i}$$

is the corresponding first positive-example intermediate feature; and if $c_{ij}$ denotes the second positive-example intermediate similarity, $$\hat{u}_{j|i}$$

is the corresponding second positive-example intermediate feature. Specifically, the positive-example feature vector length may be calculated by the following equation:

$$v_j = \text{squash}\left(\sum_i^l c_{ij} \hat{u}_{j|i}\right)$$

Where, the squash function is a squash function used for mapping a larger inputted value to a smaller interval 0~1, and l is the total number of the first feature and the second feature.

Step 512. Calculate an updated positive-example iteration center according to the initial positive-example feature vector length and the initial positive-example iteration center, use the updated positive-example iteration center as the current positive-example iteration center, and perform the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length.

Since the convergence condition of the positive-example iteration processing is set in advance, if the calculated initial positive-example feature vector length is not the final positive-example feature vector length, the positive-example iteration processing needs to be repeated until the convergence condition is satisfied, so that the positive-example feature vector length can be output. The convergence condition may be customized, for instance, customizing the number of iterations, or determining the convergence condition to be satisfied if the positive-example feature vector length satisfies a preset length.

In one embodiment, according to the initial positive-example feature vector length and the initial positive-example iteration center, the updated positive-example iteration center is calculated and used as the current positive-example iteration center, and the operation of respectively calculating a similarity between the first positive-example intermediate feature and the current positive-example iteration center and a similarity between the second positive-example intermediate feature and the current positive-example iteration center is performed, so as to repeat the positive-example iteration processing until the convergence condition is satisfied, thereby obtaining the positive-example feature vector length. The means for calculating the updated positive-example iteration center according to the initial positive-example feature vector length and the initial positive-example iteration center may be customized, for instance, calculating a mean value of the initial positive-example feature vector length and the initial positive-example iteration center as the updated positive-example iteration center; or, calculating a weighted sum of the initial positive-example feature vector length and the initial positive-example iteration center as the updated positive-example iteration center.

In an embodiment, as shown in FIG. 6, the 14th step is to calculate the updated positive-example iteration center. The updated positive-example iteration center may be the mean value of the initial positive-example feature vector length and the initial positive-example iteration center. The updated positive-example iteration center may be calculated by the following equation:

$$k_j = \frac{k_j + v_j}{2}$$

In one embodiment, the positive-example feature vector length may be output when the positive-example iteration processing satisfies the convergence condition. As shown in the 16th step in FIG. 6, the 16th step obtains the final positive-example feature vector length according to the positive-example feature vector length of the last iteration when the convergence condition is satisfied. The final positive-example feature vector length may be calculated by the following equation:

$$\|v_j\| = \|w_j * v_j\|$$

Where, $w_j$ is the preset weight coefficient corresponding to the positive-example iteration processing, $v_j$ on the left side of the equation is the final positive-example feature vector length, and $v_j$ on the right side of the equation is the positive-example feature vector length of the last iteration when the convergence condition is satisfied.

Figure 7:
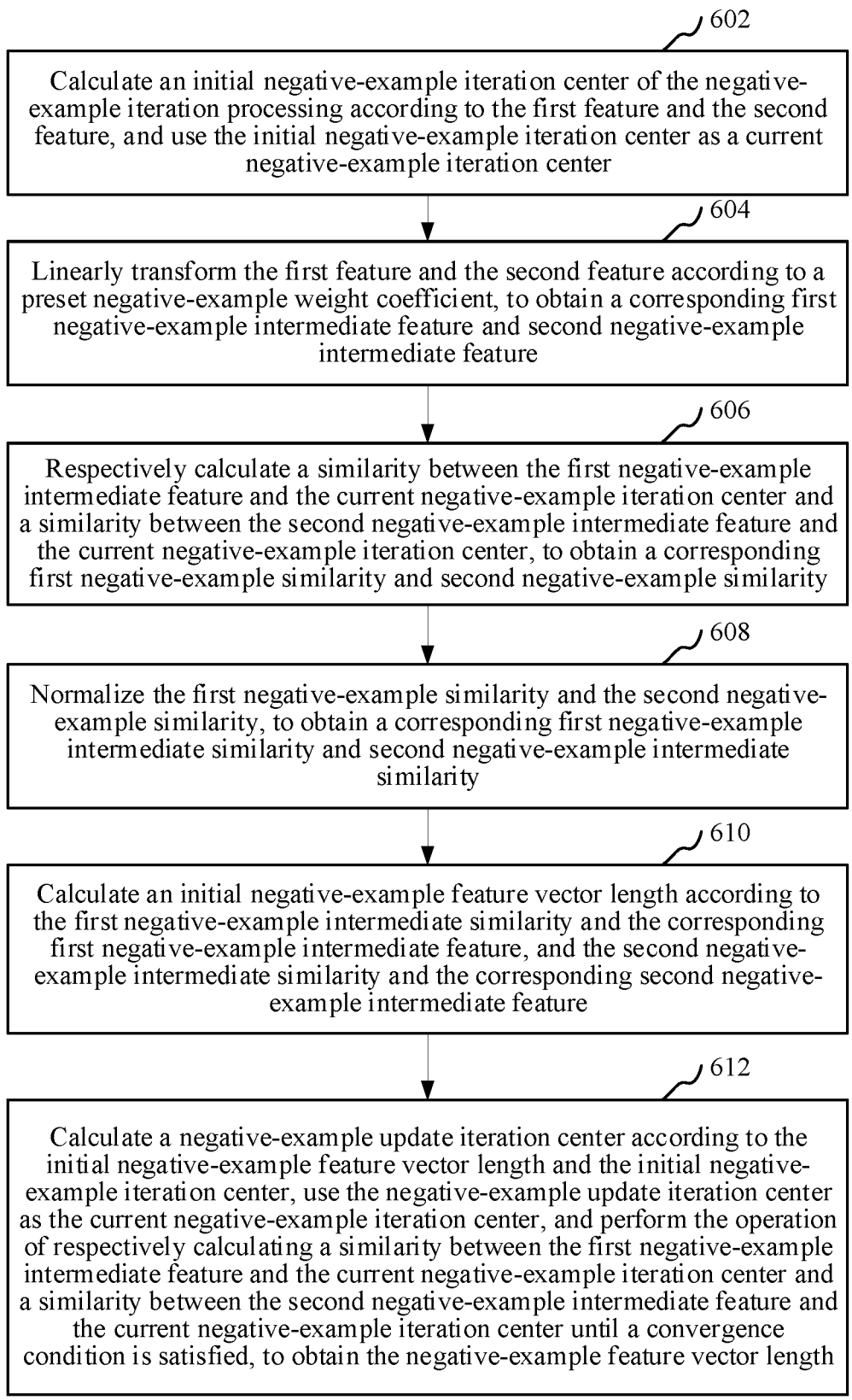
FIG. 7 is a schematic flowchart of negative-example iteration processing according to an embodiment.

In an embodiment, as shown in FIG. 7, the operation of performing the negative-example iteration processing according to the first feature and the second feature to obtain the corresponding negative-example feature vector length includes:

Step 602. Calculate an initial negative-example iteration center of the negative-example iteration processing according to the first feature and the second feature, and use the initial negative-example iteration center as a current negative-example iteration center.

After obtaining the first feature and the second feature, the pronoun resolution neural network needs to perform the negative-example iteration processing on the first feature and the second feature. First, the initial negative-example iteration center of the negative-example iteration processing is obtained as the current negative-example iteration center. Herein, the current negative-example iteration center is a reference center for the negative-example iteration processing. Specifically, the initial negative-example iteration center may be calculated according to the first feature and the second feature. The calculation means may be customized, for instance, calculating a weighted sum of the first feature and the second feature as the initial negative-example iteration center; or, calculating a mean value of the first feature and the second feature as the initial negative-example iteration center, etc.

In an embodiment, as shown in FIG. 6, FIG. 6 is herein a schematic diagram of coding of the negative-example iteration processing according to an embodiment. During the negative-example iteration processing, FIG. 6 is a schematic diagram of coding of the negative-example iteration processing according to an embodiment. As shown in FIG. 6, $u_i$ denotes the first feature or the second feature, and $k_j$ denotes the current negative-example iteration center. The initial negative-example iteration center shown in FIG. 6 is obtained by calculating the weighted sum of the first feature and the second feature, and then using the tan h function to transform the weighted sum. Specifically, the initial negative-example iteration center may be calculated by the following equation:

$$k_j = \tanh\left(\sum_i^l u_i\right)$$

Where, l denotes the total number of first feature and second feature, $u_i$ denotes the first feature or the second feature, and $k_j$ denotes the initial negative-example iteration center.

Step 604. Linearly transforming the first feature and the second feature according to a preset negative-example weight coefficient, to obtain a first negative-example intermediate feature and a second negative-example intermediate feature.

The preset negative-example weight coefficient herein is a weight coefficient used for the linear transformation of the first feature and the second feature during the negative-example iteration processing. The preset negative-example weight coefficient is obtained by the training of the pronoun resolution neural network. That is, the weight coefficients used for the linear transformation of the first feature and the second feature during the negative-example iteration processing are both the preset negative-example weight coefficient.

In one embodiment, the first feature and the second feature are respectively linearly transformed according to the preset negative-example weight coefficient, so as to obtain the corresponding first negative-example intermediate feature and second negative-example intermediate feature. Specifically, the linear transformation may be performed by calculating the product of the preset negative-example weight coefficient and the first feature to obtain the first negative-example intermediate feature, and calculating the product of the preset negative-example weight coefficient and the second feature to obtain the second negative-example intermediate feature.

In an embodiment, as shown in FIG. 6, $u_i$ denotes the first feature or the second feature;

$$\hat{u}_{j|i}$$

denotes the negative-example intermediate feature corresponding to $u_i$; if $u_i$ is the first feature, $$\hat{u}_{j|i}$$

is the first negative-example intermediate feature; and if $u_i$ is the second feature, $$\hat{u}_{j|i}$$

is the second negative-example intermediate feature; and $\hat{w}_{j|i}$ is the preset negative-example weight coefficient for the negative-example iteration processing. Specifically, the linear transformation of the first feature and the second feature may be defined by the following equation:

$$\hat{u}_{j|i} = \hat{w}_{j|i} * u_i$$

Step 606. Respectively calculate a similarity between the first negative-example intermediate feature and the current negative-example iteration center and a similarity between the second negative-example intermediate feature and the current negative-example iteration center, to obtain a first negative-example similarity and a second negative-example similarity.

The similarity is a measurement to comprehensively evaluate how close two objects are. The similarity herein is to evaluate how close the negative-example intermediate feature and the current negative-example iteration center are. The higher the similarity is, the closer the negative-example intermediate feature and the current negative-example iteration center are. Otherwise, the negative-example intermediate feature is not similar to the current negative-example iteration center. In one embodiment, after obtaining the first negative-example intermediate feature and the second negative-example intermediate feature, the similarity between the first negative-example intermediate feature and the current negative-example iteration center, and the similarity between the second negative-example intermediate feature and the current negative-example iteration center are respectively calculated, so as to obtain the first negative-example similarity and the second negative-example similarity. The means for calculating the similarity may be customized, including but not limited to, a means of using Euclidean distance, cosine similarity, etc.

In an embodiment, as shown in FIG. 6, $\hat{u}_{j|i}$ denotes the negative-example intermediate feature corresponding to $u_i$, $k_j$ denotes the current negative-example iteration center, and $\partial_{ij}$ denotes the negative-example similarity. If $\hat{u}_{j|i}$ denotes the first negative-example intermediate feature, $\partial_{ij}$ denotes the first negative-example similarity; and if $\hat{u}_{j|i}$ denotes the second negative-example intermediate feature, $\partial_{ij}$ denotes the second negative-example similarity. Specifically, the negative-example similarity may be calculated by the following equation:

$$\partial_{ij} = \hat{u}_{j|i} * k_j$$

Step 608. Normalize the first negative-example similarity and the second negative-example similarity, to obtain a first negative-example intermediate similarity and a second negative-example intermediate similarity.

The normalization is a way to simplify calculations. That is, a dimensional expression is transformed into a dimensionless expression and becomes a scalar. For instance, the negative-example similarity is transformed into a decimal between (0,1), or transformed to 0 or 1. Specifically, the means for normalizing the first negative-example similarity and the second negative-example similarity may include, but not limited to, a means of using the softmax function (also known as normalized exponential function).

In an embodiment, as shown in FIG. 6, $c_j$ is the negative-example intermediate similarity obtained after the normalization, $\partial_j$ is the first negative-example similarity and the second negative-example similarity. If $\partial_j$ is the first negative-example similarity, $c_j$ is a first negative-example intermediate similarity; and if $\partial_j$ is the second negative-example similarity, $c_j$ is a second negative-example intermediate similarity. Specifically, the negative-example intermediate similarity may be calculated by the following equation:

$$c_j = \text{soft max}(\partial_j)$$

Step 610. Calculate an initial negative-example feature vector length according to the first negative-example intermediate similarity and the corresponding first negative-example intermediate feature, the second negative-example intermediate similarity and the corresponding second negative-example intermediate feature.

The initial negative-example feature vector length refers to the negative-example feature vector length of the first negative-example iteration. Specifically, the initial negative-example feature vector length may be calculated according to the first negative-example intermediate similarity and the corresponding first negative-example intermediate feature, and the second negative-example intermediate similarity and the corresponding second negative-example intermediate feature. The calculation means may be customized, for instance, calculating a sum of the first negative-example intermediate similarity and the corresponding first negative-example intermediate feature, and the second negative-example intermediate similarity and the corresponding second negative-example intermediate feature as the initial negative-example feature vector length; or, calculating a mean value of the first negative-example intermediate similarity and the corresponding first negative-example intermediate feature, and the second negative-example intermediate similarity and the corresponding second negative-example intermediate feature as the initial negative-example feature vector length.

In an embodiment, as shown in FIG. 6, $v_j$ denotes the negative-example feature vector length, $c_{ij}$ denotes the negative-example intermediate similarity, $\hat{u}_{j|i}$ denotes the negative-example intermediate feature. If $c_{ij}$ denotes the first negative-example intermediate similarity, $u'_{j|i}$ is the corresponding first negative-example intermediate feature; and if $c_{ij}$ denotes the second negative-example intermediate similarity, $u'_{j|i}$ is the corresponding second negative-example intermediate feature. Specifically, the negative-example feature vector length may be calculated by the following equation:

$$v_j = \text{squash}\left(\sum_i^l c_{ij} u'_{j|i}\right)$$

Where, the squash function is a squash function configured for mapping a larger inputted value to a smaller interval 0~1, and l is the total number of first feature and second feature.

Step 612. Calculate an updated negative-example iteration center according to the initial negative-example feature vector length and the initial negative-example iteration center, use the updated negative-example iteration center as the current negative-example iteration center, and perform the operation of respectively calculating a similarity between the first negative-example intermediate feature and the current negative-example iteration center and a similarity between the second negative-example intermediate feature and the current negative-example iteration center until a convergence condition is satisfied, to obtain the negative-example feature vector length.

Since the convergence condition of the negative-example iteration processing is set in advance, if the calculated initial negative-example feature vector length is not the final negative-example feature vector length, the negative-example iteration processing needs to be repeated until the convergence condition is satisfied, so that the negative-example feature vector length can be output. The convergence condition may be customized, for instance, customizing the number of iterations, or determining the convergence condition to be satisfied if the negative-example feature vector length satisfying a preset length.

In one embodiment, according to the initial negative-example feature vector length and the initial negative-example iteration center, the updated negative-example iteration center is calculated and used as the current negative-example iteration center, and the operation of respectively calculating a similarity between the first negative-example intermediate feature and the current negative-example iteration center and a similarity between the second negative-example intermediate feature and the current negative-example iteration center is performed, so as to repeat the negative-example iteration processing until the convergence condition is satisfied, thereby obtaining the negative-example feature vector length. The means for calculating the updated negative-example iteration center according to the initial negative-example feature vector length and the initial negative-example iteration center may be customized, for instance, calculating a mean value of the initial negative-example feature vector length and the initial negative-example iteration center as the updated negative-example iteration center; or, calculating a weighted sum of the initial negative-example feature vector length and the initial negative-example iteration center as the updated negative-example iteration center.

In an embodiment, as shown in FIG. 6, the 14th step is to calculate the updated negative-example iteration center. The updated negative-example iteration center may be the mean value of the initial negative-example feature vector length and the initial negative-example iteration center. The updated negative-example iteration center may be calculated by the following equation:

$$k_j = \frac{k_j + v_j}{2}$$

In one embodiment, the negative-example feature vector length may be output when the negative-example iteration processing satisfies the convergence condition. As shown in the 16th step in FIG. 6, the 16th step obtains the final negative-example feature vector length according to the negative-example feature vector length of the last iteration when the convergence condition is satisfied. The final negative-example feature vector length may be calculated by the following equation:

$$\|v_j\| = \|w_j * v_j\|$$

Where, $w_j$ is the preset weight coefficient corresponding to the negative-example iteration processing, $v_j$ on the left side of the equation is the final negative-example feature vector length, and $v_j$ on the right side of the equation is the negative-example feature vector length of the last iteration when the convergence condition is satisfied.

Figure 8:
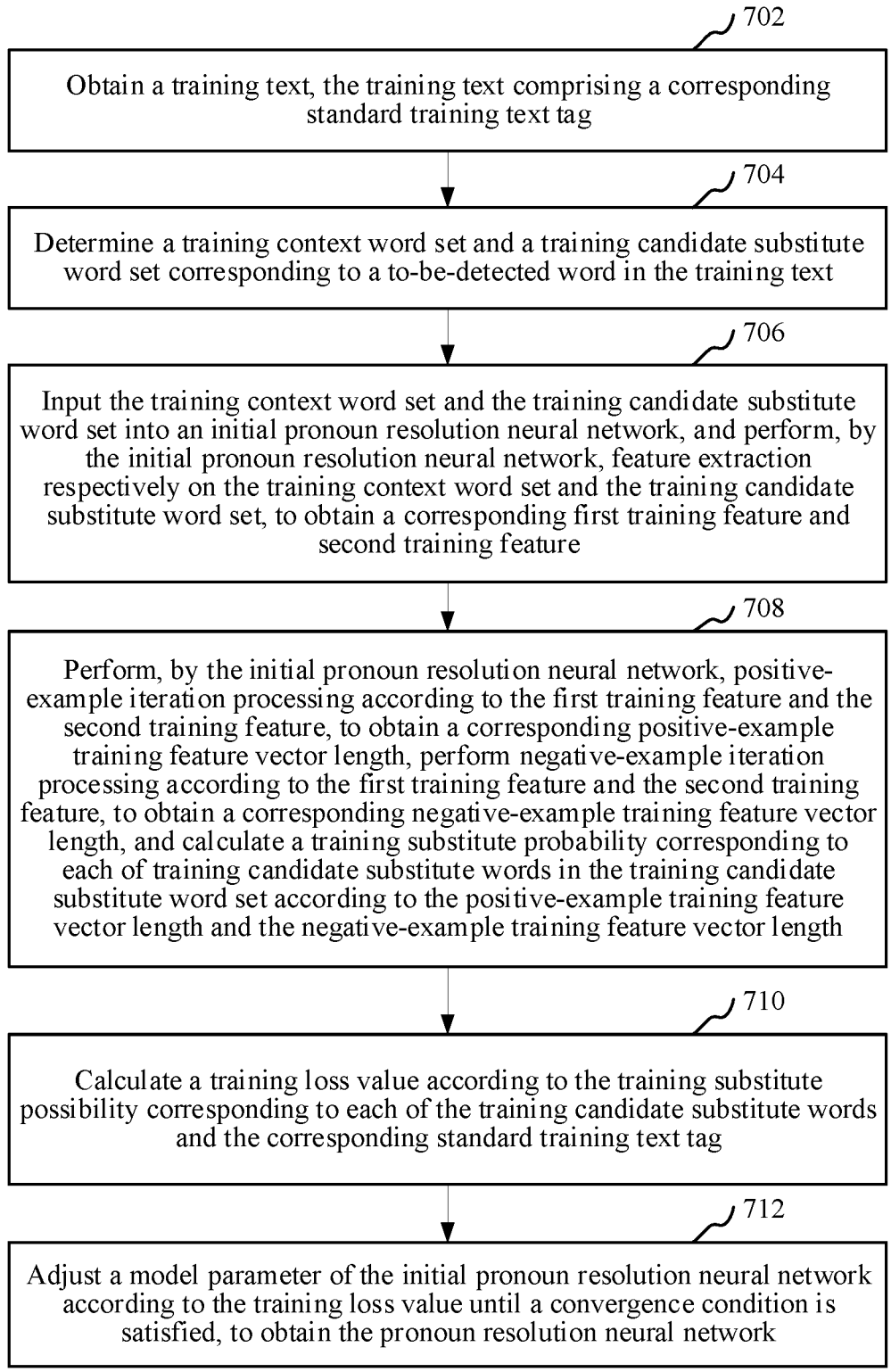
FIG. 8 is a schematic flowchart of a pronoun resolution neural network training method according to an embodiment.

In an embodiment, as shown in FIG. 8, a pronoun resolution neural network training method is provided. In one embodiment, as an example, the method is mainly applied to the terminal 110 or the server 120 in FIG. 1. Referring to FIG. 8, the pronoun resolution neural network training method specifically includes the following steps:

Step 702. Obtain a training text, the training text including a corresponding standard training text tag.

The training text is inputted data used for training the pronoun resolution neural network. One or more training texts may be used. The training text may be obtained in real time or stored in advance. The training text has the corresponding standard training text tag. Since the training text has the to-be-detected word, the corresponding standard training text tag in the training text is the actual pronoun of the to-be-detected word in the training text.

Step 704. Determine a training context word set and a training candidate substitute word set corresponding to the to-be-detected word in the training text.

Before inputting the training text into the pronoun resolution neural network for training, the training text needs to be preprocessed, which specifically includes determining the training context word set and the training candidate substitute word set corresponding to the to-be-detected word in the training text. In one embodiment, the training text is segmented into words; the syntactic analysis is performed on the words to determine the position of the to-be-detected word; then, training forward words and training backward words are obtained according to the position of the to-be-detected word. The training forward words constitute a training ante-context word sequence, and the backward words constitute a training post-context word sequence. The training context word set is constituted by the training ante-context word sequence and the training post-context word sequence.

In one embodiment, training candidate substitute words are obtained according to the syntactic analysis result. The training candidate substitute word set is constituted by the training candidate substitute words.

Step 706. Input the training context word set and the training candidate substitute word set into an initial pronoun resolution neural network. The initial pronoun resolution neural network respectively performs the feature extraction on the training context word set and the training candidate substitute word set, to obtain a first training feature and a second training feature.

The initial pronoun resolution neural network is an untrained pronoun resolution neural network. The initial pronoun resolution neural network may be a capsule network, a support vector machine (SVM) classifier, an artificial neural network (ANN) classifier, or a logistic regression (LR) classifier, etc.

In one embodiment, the training context word set and the training candidate substitute word set are input into the initial pronoun resolution neural network. The initial pronoun resolution neural network performs the feature extraction on the training context word set using the feature representation sub-network, to obtain the first training feature corresponding to the training context word set; and performs the feature extraction on the training candidate substitute word set using the feature representation sub-network, to obtain the second training feature corresponding to the training candidate substitute word set.

Step 708. The initial pronoun resolution neural network performs the positive-example iteration processing according to the first training feature and the second training feature, to obtain a corresponding positive-example training feature vector length; performs the negative-example iteration processing according to the first training feature and the second training feature, to obtain a corresponding negative-example training feature vector length; and calculates a training substitute probability corresponding to the each training candidate substitute word in the training candidate substitute word set according to the positive-example training feature vector length and the negative-example training feature vector length.

The positive-example iteration processing refers to a process of repeatedly performing the iterative calculation on the features to obtain the positive-example training feature vector length. The positive-example training feature vector length refers to a length of the positive-example training feature vector. The positive-example training feature vector is a feature vector corresponding to the positive-example substitute probability. The positive-example substitute probability corresponding to each candidate substitute word is the probability that the to-be-detected word in the training text matches the candidate substitute word. The positive-example iteration processing may be an iterative calculation process in which the customized dynamic routing algorithm is used to obtain the positive-example feature vector length. The customized dynamic routing algorithm may be used for the positive-example iteration processing and the negative-example iteration processing. Since the positive-example iteration processing and the negative-example iteration processing correspond to different preset weight coefficients, the positive-example training feature vector length and the negative-example training feature vector length are respectively obtained by performing the calculation on the first feature and the second feature using the customized dynamic routing algorithm.

The negative-example iteration processing refers to a process of repeatedly performing the iterative calculation on the features to obtain the negative-example training feature vector length. The negative-example training feature vector length refers to a length of the negative-example training feature vector. The negative-example training feature vector is a feature vector corresponding to the negative-example substitute probability. The negative-example substitute probability corresponding to each candidate substitute word refers to the probability that the to-be-detected word in the to-be-detected text mismatches the candidate substitute word.

In one embodiment, using the customized dynamic routing algorithm to calculate the positive-example training feature vector length and the negative-example training feature vector length may be performed as: calculating an initial iteration center according to the first training feature and the second training feature as an initial iteration center of the positive-example iteration processing and the negative-example iteration processing; using the initial iteration center as the current iteration center; linearly transforming the first training feature and the second training feature according to the preset weight coefficients corresponding to the positive-example and negative-example iteration processing, to obtain the first intermediate training features and the second intermediate training features corresponding to the positive-example iteration processing and the negative-example iteration processing; respectively calculating similarities between the first intermediate training features corresponding to the positive-example iteration processing and the negative-example iteration processing and the current iteration center, and similarities between the second intermediate training features corresponding to the positive-example iteration processing and the negative-example iteration processing and the current iteration center, to obtain the first training similarities and the second training similarities corresponding to the positive-example iteration processing and the negative-example iteration processing; normalizing the first training similarities and the second training similarities corresponding to the positive-example iteration processing and the negative-example iteration processing, to obtain the first intermediate training similarities and the second intermediate training similarities corresponding to the positive-example iteration processing and the negative-example iteration processing; and calculating the initial training feature vector lengths corresponding to the positive-example iteration processing and the negative-example iteration processing according to the first intermediate training similarities and the second intermediate training similarities corresponding to the positive-example iteration processing and the negative-example iteration processing, and the corresponding first intermediate training features and the second intermediate training features.

Then, the iteration centers are updated according to the first intermediate training similarities and the second intermediate training similarities corresponding to the positive-example iteration processing and the negative-example iteration processing, and the initial iteration center; the updated iteration centers are used as the current iteration centers; and the operation of respectively calculating similarities between the first intermediate training features corresponding to the positive-example iteration processing and the negative-example iteration processing and the current iteration center, and similarities between the second intermediate training features corresponding to the positive-example iteration processing and the negative-example iteration processing and the current iteration center is performed until the convergence condition is satisfied, so as to obtain the positive-example training feature vector length corresponding to the positive-example iteration processing and the negative-example training feature vector length corresponding to the negative-example iteration processing.

After performing the positive-example iteration processing and the negative-example iteration processing on the first training feature and the second training feature to obtain the positive-example training feature vector length and the negative-example training feature vector length, the training substitute probability corresponding to each training candidate substitute word in the training candidate substitute word set is calculated according to the positive-example training feature vector length and the negative-example training feature vector length. The training substitute probability includes but is not limited to the positive-example training substitute probability and the negative-example training substitute probability. The positive-example training substitute probability corresponding to each training candidate substitute word in the training candidate substitute word set refers to the substitute probability that the training candidate substitute word can substitute the to-be-detected word. The negative-example substitute probability corresponding to each training candidate substitute word in the training candidate substitute word set refers to the substitute probability that the training candidate substitute word cannot substitute the to-be-detected word.

According to the positive-example training feature vector length and the negative-example training feature vector length, the training substitute probability corresponding to each training candidate substitute word in the training candidate substitute word set may be calculated by the following equations:

$$p_{pos} = \frac{e^{\|v_{neg}\|}}{e^{\|v_{neg}\|} - e^{\|v_{pos}\|}}$$

$$p_{neg} = \frac{e^{\|v_{pos}\|}}{e^{\|v_{neg}\|} + e^{\|v_{pos}\|}}$$

Where, $P_{pos}$ denotes the positive-example training substitute probability, $P_{neg}$ denotes the negative-example training substitute probability, $V_{pos}$ denotes the positive-example training feature vector length, and $V_{neg}$ denotes the negative-example training feature vector length.

Step 710. Calculate a training loss value according to the training substitute probability corresponding to each training candidate substitute word and the corresponding standard training text tag.

The training loss value is used for adjusting the model parameters of the initial pronoun resolution neural network. Specifically, the training loss value may be calculated according to the training substitute probability corresponding to each training candidate substitute word and the corresponding standard training text tag. The means for calculating the training loss value may be customized, for instance, calculating the training loss value according to the positive-example training substitute possibilities in the training substitute possibilities and the corresponding standard training text tag, and the negative-example training substitute possibilities and the corresponding standard training text tag. For instance, the training loss value may be calculated by the following equation:

$$p_{pos} = \frac{e^{\|v_{neg}\|}}{e^{\|v_{neg}\|} + e^{\|v_{pos}\|}}$$

-continued $$p_{neg} = \frac{e^{\|v_{pos}\|}}{e^{\|v_{neg}\|} + e^{\|v_{pos}\|}}$$

$$J(\theta) = \max_{\theta} \sum_{i=1}^{N} \left[ y_i * \log(p_{pos}^i) + (1 - y_i) * \log(p_{neg}^i) \right]$$

Where, $P_{pos}$ denotes the positive-example training substitute probability, $P_{neg}$ denotes the negative-example training substitute probability, $V_{pos}$ denotes the positive-example training feature vector length, $V_{neg}$ denotes the negative-example training feature vector length, $J(\theta)$ denotes the training loss value, and $y_i$ denotes the standard training text tag of a training sample.

Step 712. Adjust the model parameters of the initial pronoun resolution neural network according to the training loss value until a convergence condition is satisfied, to obtain the pronoun resolution neural network.

After calculating the training loss value, the model parameters of the initial pronoun resolution neural network are continuously adjusted according to the training loss value until the convergence condition is satisfied, so as to obtain the pronoun resolution neural network. The convergence condition may be customized. For instance, if the training loss value no longer changes, or the number of adjustments reaches a preset number, etc., the convergence condition is considered to be satisfied, thereby obtaining the pronoun resolution neural network.

In accordance with the above-mentioned pronoun resolution neural network training method, during the training process, the pronoun resolution neural network can make good use of the features corresponding to the training context word set and the training candidate substitute word set in the training text, so as to well fuse the features corresponding to the training context word set and the training candidate substitute word set, thereby improving the accuracy of the pronoun resolution neural network.

In an embodiment, the pronoun resolution neural network training method further includes: obtain an anti-interference feature set, and input anti-interference features in the anti-interference feature set into the initial pronoun resolution neural network. The initial pronoun resolution neural network generates an additional training feature according to the first training feature, the second training feature, and the anti-interference features.

The anti-interference feature set includes the features that are used to prevent interference from other features during the training of the initial pronoun resolution neural network. The anti-interference feature set is input to the initial pronoun resolution neural network for training, so as to improve the output accuracy of the pronoun resolution neural network. The anti-interference feature set may include a set of artificially designed comprehensive features. In one embodiment, after obtaining the anti-interference feature set, the anti-interference feature set is input to the initial pronoun resolution neural network, so that the initial pronoun resolution neural network generates the additional training feature according to the first training feature, the second training feature, and the anti-interference features. The specific process of the initial pronoun resolution neural network generating the additional training feature according to the first training feature, the second training feature, and the anti-interference features may refer to step 204 in FIG. 2 and will not be described herein.

In one embodiment, the initial pronoun resolution neural network performs the positive-example iteration processing according to the first training feature and the second training feature, to obtain the corresponding positive-example training feature vector length; and performs the negative-example iteration processing according to the first training feature and the second training feature, to obtain the corresponding negative-example training feature vector length, including: the initial pronoun resolution neural network performs the positive-example iteration processing according to the first training feature, the second training feature, the anti-interference features and the additional training feature, to obtain the corresponding positive-example training feature vector length; and performs the negative-example iteration processing according to the first training feature, the second training feature, the anti-interference features and the additional training feature, to obtain the corresponding negative-example training feature vector length.

In one embodiment, after generating the additional training feature corresponding to the first training feature, the second training feature and the anti-interference features, the initial pronoun resolution neural network performs the positive-example iteration processing according to the first training feature, the second training feature, the anti-interference features and the additional training feature, to obtain the corresponding positive-example training feature vector length; and performs the negative-example iteration processing according to the first training feature, the second training feature, the anti-interference features and the additional training feature, to obtain the corresponding negative-example training feature vector length. The details may refer to step 206 in FIG. 2 and will not be described herein.

In an embodiment, the calculation of the training substitute probability corresponding to each training candidate substitute word in the training candidate substitute word set according to the positive-example training feature vector length and the negative-example training feature vector length includes: calculate the positive-example training substitute probability and the negative-example training substitute probability corresponding to each training candidate substitute word in the training candidate substitute word set according to the positive-example training feature vector length and the negative-example training feature vector length.

The positive-example training substitute probability corresponding to each training candidate substitute word refers to the probability that the to-be-detected word in the training text matches the training candidate substitute word, and the negative-example training possibility corresponding to each training candidate substitute word refers to the probability that the to-be-detected word in the training text mismatches the training candidate substitute word. In one embodiment, the positive-example training substitute probability and the negative-example training substitute probability corresponding to each training candidate substitute word in the training candidate substitute word set may be calculated according to the positive-example training feature vector length and the negative-example training feature vector length. The calculation means may be customized, for instance, a means of using the customized dynamic routing algorithm. The customized dynamic routing algorithm may refer to step 206 in FIG. 2 and will not be described herein.

In an embodiment, the positive-example training substitute probability and the negative-example training substitute probability corresponding to each training candidate substitute word in the training candidate substitute word set are calculated according to the positive-example training feature vector length and the negative-example training feature vector length. The positive-example training substitute probability and the negative-example training substitute probability may be calculated by the following equations:

$$p_{pos} = \frac{e^{\|v_{neg}\|}}{e^{\|v_{neg}\|} - e^{\|v_{pos}\|}}$$

$$p_{neg} = \frac{e^{\|v_{pos}\|}}{e^{\|v_{neg}\|} + e^{\|v_{pos}\|}}$$

Where, $P_{pos}$ denotes the positive-example training substitute probability, $P_{neg}$ denotes the negative-example training substitute probability, $V_{pos}$ denotes the positive-example training feature vector length, and $V_{neg}$ denotes the negative-example training feature vector length.

In one embodiment, the calculation of the training loss value according to the training substitute probability corresponding to each training candidate substitute word and the corresponding standard training text tag includes: calculate the training loss value according to the positive-example training substitute probability corresponding to each training candidate substitute word and the corresponding standard training text tag, and the negative-example training substitute probability and the corresponding standard training text tag.

In one embodiment, the training loss value may be calculated according to the positive-example training substitute probability corresponding to each training candidate substitute word and the corresponding standard training text tag, and the negative-example training substitute probability and the corresponding standard training text tag. The training loss value may be calculated by the following equation:

$$p_{pos} = \frac{e^{\|v_{neg}\|}}{e^{\|v_{neg}\|} + e^{\|v_{pos}\|}}$$

$$p_{neg} = \frac{e^{\|v_{pos}\|}}{e^{\|v_{neg}\|} + e^{\|v_{pos}\|}}$$

$$J(\theta) = \max_{\theta} \sum_{i=1}^{N} \left[ y_i * \log(p_{pos}^i) + (1 - y_i) * \log(p_{neg}^i) \right]$$

Where, $P_{pos}$ denotes the positive-example training substitute probability, $P_{neg}$ denotes the negative-example training substitute probability, $V_{pos}$ denotes the positive-example training feature vector length, $V_{neg}$ denotes the negative-example training feature vector length, $J(\theta)$ denotes the training loss value, and $y_i$ denotes the standard training text tag of the training sample.

In a specific embodiment, a data processing method and a pronoun resolution neural network training method are provided, including the following steps:

1. Obtain a training text, the training text including a corresponding standard training text tag.
2. Determine a training context word set and a training candidate substitute word set corresponding to a to-be-detected word in the training text.
3. Input the training context word set and the training candidate substitute word set into an initial pronoun resolution neural network. The initial pronoun resolution neural network performs the feature extraction on the training context word set and the training candidate substitute word set, to obtain a first training feature and a second training feature.

4. The initial pronoun resolution neural network performs the positive-example iteration processing according to the first training feature and the second training feature, to obtain a corresponding positive-example training feature vector length; performs the negative-example iteration processing according to the first training feature and the second training feature, to obtain a corresponding negative-example training feature vector length; and calculates a training substitute probability corresponding to each training candidate substitute word in the training candidate substitute word set according to the positive-example training feature vector length and the negative-example training feature vector length.

5. Calculate a training loss value according to the training substitute probability corresponding to each training candidate substitute word and the corresponding standard training text tag.

6. Adjust model parameters of the initial pronoun resolution neural network according to the training loss value until a convergence condition is satisfied, to obtain the pronoun resolution neural network.

7. Obtain a to-be-detected text, and determine a context word set and a candidate substitute word set corresponding to a to-be-detected word in the to-be-detected text.

7-1. Segment the to-be-detected text to obtain words.

7-2. Perform the syntactic analysis on each of the words, and determine a position of the to-be-detected word according to a syntactic analysis result.

7-3. Obtain an ante-context word sequence and a post-context word sequence according to the position of the to-be-detected word, and form the context word set from the ante-context word sequence and the post-context word sequence.

7-4. Obtain candidate substitute words according to the syntactic analysis result, and form the candidate substitute word set from the candidate substitute words.

8. Input the context word set and the candidate substitute word set into the pronoun resolution neural network. The pronoun resolution neural network respectively performs the feature extraction on the context word set and the candidate substitute word set, to obtain a first feature and a second feature.

8-1. The pronoun resolution neural network performs the compressed representation processing on the word sequence in the context word set using a forward feature representation sub-network and a reverse feature representation sub-network, to obtain a corresponding first forward sub-feature and first reverse sub-feature.

8-2. The pronoun resolution neural network performs the compressed representation processing on the character sequence corresponding to the word sequence in the context word set, to obtain a first character vector sub-feature. The first forward sub-feature, the first reverse sub-feature, and the first character vector sub-feature constitute the first feature corresponding to the context word set.

8-3. The pronoun resolution neural network performs the compressed representation processing on the word sequence in the candidate substitute word set using the forward feature representation sub-network and the reverse feature representation sub-network, to obtain a second forward sub-feature and a second reverse sub-feature feature.

8-4. The pronoun resolution neural network performs the compressed representation processing on the character sequence corresponding to the word sequence in the candidate substitute word set, to obtain a second character vector sub-feature. The second forward sub-feature, the second reverse sub-feature, and the second character vector sub-feature constitute the second feature corresponding to the candidate substitute word set.

9. The pronoun resolution neural network performs the dimensional transformation and length scaling processing on the first feature and the second feature, to obtain a first target feature and a second target feature.

10. The pronoun resolution neural network performs the positive-example iteration processing according to the first target feature and the second target feature, to obtain a corresponding positive-example feature vector length; performs the negative-example iteration processing according to the first target feature and the second target feature, to obtain a corresponding negative-example feature vector length; and calculate a substitute probability corresponding to each candidate substitute word in the candidate substitute word set according to the positive-example feature vector length and the negative-example feature vector length.

10-1. Calculate an initial positive-example iteration center of the positive-example iteration processing according to the first feature and the second feature, and use the initial positive-example iteration center as a current positive-example iteration center.

10-2. Respectively linearly transform the first feature and the second feature according to a preset positive-example weight coefficient, to obtain a first positive-example intermediate feature and a second positive-example intermediate feature.

10-3. Respectively calculate a similarity between the first positive-example intermediate feature and the current positive-example iteration center and a similarity between the second positive-example intermediate feature and the current positive-example iteration center, to obtain a first positive-example similarity and a second positive-example similarity.

10-4. Normalize the first positive-example similarity and the second positive-example similarity, to obtain a first positive-example intermediate similarity and a second positive-example intermediate similarity.

10-5. Calculate an initial positive-example feature vector length according to the first positive-example intermediate similarity and the corresponding first positive-example intermediate feature, and the second positive-example intermediate similarity and the corresponding second positive-example intermediate features.

10-6. Calculate an updated positive-example iteration center according to the initial positive-example feature vector length and the initial positive-example iteration center, use the updated positive-example iteration center as the current positive-example iteration center, and perform the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length.

10-7. Calculate an initial negative-example iteration center of the negative-example iteration processing according to the first feature and the second feature, and use the initial negative-example iteration center as a current negative-example iteration center.

10-8. Respectively linearly transform the first feature and the second feature according to a preset negative-example weight coefficient, to obtain a first negative-example intermediate feature and a second negative-example intermediate feature.

10-9. Respectively calculate a similarity between the first negative-example intermediate feature and the current negative-example iteration center and a similarity between the second negative-example intermediate feature and the current negative-example iteration center, to obtain a first negative-example similarity and a second negative-example similarity.

10-10. Normalize the first negative-example similarity and the second negative-example similarity, to obtain a first negative-example intermediate similarity and a second negative-example intermediate similarity.

10-11. Calculate an initial negative-example feature vector length according to the first negative-example intermediate similarity and the corresponding first negative-example intermediate feature, and the second negative-example intermediate similarity and the corresponding second negative-example intermediate feature.

10-12. Calculate an updated negative-example iteration center according to the initial negative-example feature vector length and the initial negative-example iteration center, use the updated negative-example iteration center as the current negative-example iteration center, and perform the operation of respectively calculating a similarity between the first negative-example intermediate feature and the current negative-example iteration center and a similarity between the second negative-example intermediate feature and the current negative-example iteration center until a convergence condition is satisfied, to obtain the negative-example feature vector length.

11. Determine a target substitute word according to the substitute probability corresponding to each the candidate substitute word.

12. Insert the target substitute word into the to-be-detected text according to the position corresponding to the to-be-detected word, to obtain a target text.

Figures 9, 10:
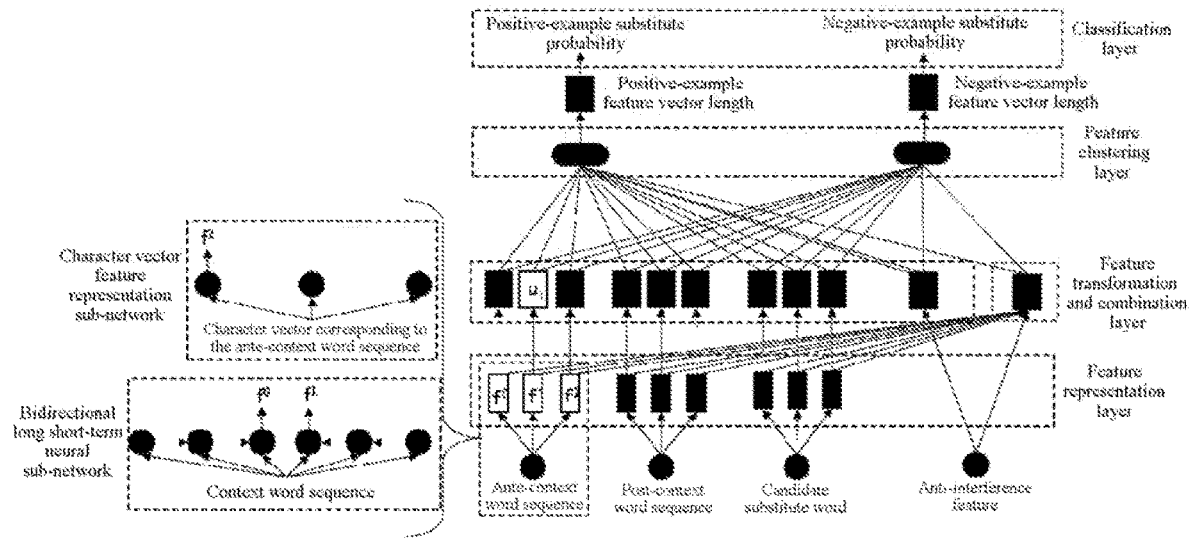
FIG. 9 is a structural schematic diagram of a pronoun resolution neural network according to an embodiment.
FIG. 10 is a schematic diagram illustrating a comparison of verification results of a pronoun resolution neural network according to an embodiment.

In an application scenario of Chinese zero-pronoun resolution, as shown in FIG. 9, FIG. 9 is a structural schematic diagram of a pronoun resolution neural network according to an embodiment. The pronoun resolution neural network includes: a feature representation layer, a feature transformation and combination layer, a feature clustering layer, and a classification layer.

In one embodiment, the to-be-detected text is obtained and preprocessed, to obtain the context word set and the candidate substitute word set corresponding to the to-be-detected word in the to-be-detected text. The context word set and the candidate substitute word set are input into the pronoun resolution neural network. The feature representation layer of the pronoun resolution neural network performs the feature extraction on the context word set and the candidate substitute word set, to obtain the corresponding the first feature and second feature. Specifically, the feature representation layer uses a bidirectional long short-term neural sub-network to represent the word sequences in the context word set and the candidate substitute word set; and uses a character vector feature representation sub-network BERT to represent the character sequences corresponding to the word sequences in the context word set and the candidate substitute word set. After representing the context word set and the candidate substitute word set, three sets of features are respectively obtained. That is, the first feature includes two sets of features $f^0$ and $f^1$ corresponding to the word sequence in the context word set, and one set of features $f^2$ corresponding to the character sequence corresponding to the word sequence. The second feature includes two sets of features $f^0$ and $f^1$ corresponding to the word sequence in the candidate substitute word set, and one set of features $f^2$ corresponding to the character sequence corresponding to the word sequence.

The feature transformation and combination layer perform the dimensional transformation and length scaling processing on the features extracted by the feature representation layer. Since there exists dimension diversity and length diversity between the vectors outputted by the feature representation layer, the dimensional transformation and length scaling processing needs to be performed on the features. Specifically, the linear transformation function may be used for scaling the dimensions of the features, and the length scaling function (squash) may be used for scaling the lengths of the features. Finally, the corresponding first target feature and second target feature are obtained.

The feature clustering layer performs iterative weighted clustering on the features. In one embodiment, the pronoun resolution neural network performs the positive-example iteration processing according to the first target feature and the second target feature using the feature clustering layer, to obtain the corresponding positive-example feature vector length; and performs the negative-example iteration processing according to the first target feature and the second target feature, to obtain the corresponding negative-example feature vector length. That is, after inputting the features outputted by the feature transformation and combination layer to the feature clustering layer, the feature clustering layer calculates two vector lengths, namely, the positive-example feature vector length and the negative-example feature vector length.

The pronoun resolution neural network inputs the positive-example feature vector length and the negative-example feature vector length outputted by the feature clustering layer to the classification layer. The classification layer calculates the substitute probability corresponding to each candidate substitute word in the candidate substitute word set according to the positive-example feature vector length and the negative-example feature vector length; and determines the target substitute word according to the substitute probability corresponding to each candidate substitute word in the candidate substitute word set. For instance, the candidate substitute word with the highest substitute probability is determined as the target substitute word. Finally, the target substitute word is inserted at the position corresponding to the to-be-detected word in the to-be-detected text, so as to obtain the target text.

For instance, the to-be-detected text is: "Xiaoming ate an apple today, very sweet". The position of the to-be-detected word in the to-be-detected text is determined to be before "very sweet", that is, some content is omitted before "very sweet". The candidate substitute words are: "Xiaoming" and "apple". The pronoun resolution neural network calculates the substitute probability corresponding to "Xiaoming" is to be 0.4, and the substitute probability corresponding to "apple" is to be 0.9. Thus, the target substitute word is determined to be: "apple". Then, the word "apple" is inserted at the position of the to-be-detected word in the to-be-detected text, obtaining the target text as: "Xiaoming ate an apple today, the apple was very sweet".

The training of the pronoun resolution neural network is similar to the application of the pronoun resolution neural network, and the inputted data is the training text including the standard training text tag. However, during the training process, in order to improve the application accuracy of the pronoun resolution neural network, it is necessary to introduce the anti-interference feature set, so as to input the anti-interference features in the anti-interference feature set into the pronoun resolution neural network for the training. The training loss value of the pronoun resolution neural network is calculated according to the training substitute probability corresponding to each training candidate substitute word obtained in the training process and the corresponding standard training text tag. Finally, the pronoun resolution neural network is trained according to the training loss value, to continuously adjust the model parameters until the convergence condition is satisfied, thereby obtaining the final pronoun resolution neural network.

In an embodiment, as shown in FIG. 10, FIG. 10 is a schematic diagram illustrating a comparison of verification results of a pronoun resolution neural network according to an embodiment. As shown in FIG. 10, the last line of ZP-CapsNet in FIG. 10 shows the corresponding verification results of the pronoun resolution neural network of the present disclosure on the six test data sets, and the other lines (from the first line Zhao and Ng to the penultimate line Yin et al) show the verification results of the comparative pronoun resolution neural networks on the six test data sets. The six test data sets include Broadcast News (BN), Newswires (NW), Broadcast Conversations (BC), Telephone Conversation (TC), Web Blogs (WB), and Magazines (MZ). The verification result is an intermediate value of an accuracy rate and a recall rate. The Overall of each pronoun resolution neural network in FIG. 10 is a comprehensive value calculated based on the verification results of the six test data sets. From the Overall in FIG. 10, the pronoun resolution neural network of the present disclosure has a better effect in the actual pronoun resolution application than the other comparative pronoun resolution neural networks.

Although the steps in the flowchart are sequentially shown according to indication of an arrow, the steps are not necessarily sequentially performed according to a sequence indicated by the arrow. Unless otherwise explicitly specified in the present disclosure, execution of the steps is not strictly limited, and the steps may be performed in other sequences. In addition, at least some steps in the flowcharts may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of another step.

Figure 11:
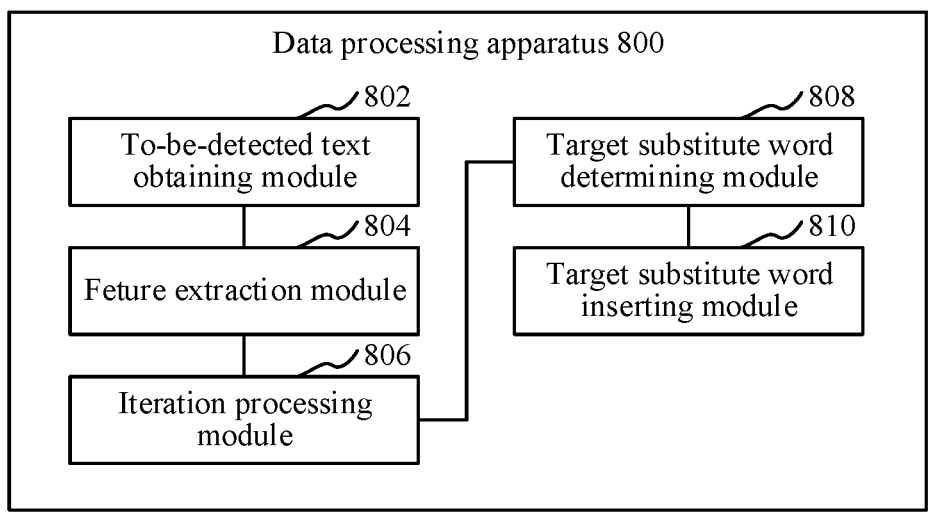
FIG. 11 is a structural block diagram of a data processing apparatus according to an embodiment.

In an embodiment, as shown in FIG. 11, a data processing apparatus 800 is provided, including:

A to-be-detected text obtaining module 802, configured to obtain a to-be-detected text, and determine a context word set and a candidate substitute word set corresponding to a to-be-detected word in the to-be-detected text.

A feature extraction module 804, configured to input the context word set and the candidate substitute word set into a pronoun resolution neural network, and respectively perform, by the pronoun resolution neural network, feature extraction on the context word set and the candidate substitute word set to obtain a first feature and a second feature.

An iteration processing module 806, configured to perform, by the pronoun resolution neural network, positive-example iteration processing according to the first feature and the second feature to obtain a corresponding positive-example feature vector length, perform negative-example iteration processing according to the first feature and the second feature to obtain a corresponding negative-example feature vector length, and calculate a substitute probability corresponding to each candidate substitute word in the candidate substitute word set according to the positive-example feature vector length and the negative-example feature vector length.

A target substitute word determining module 808, configured to determine a target substitute word according to the substitute probability corresponding to the each candidate substitute word.

A target substitute word inserting module 810, configured to insert the target substitute word into the to-be-detected text according to a position corresponding to the to-be-detected word, to obtain a target text.

Figure 12:
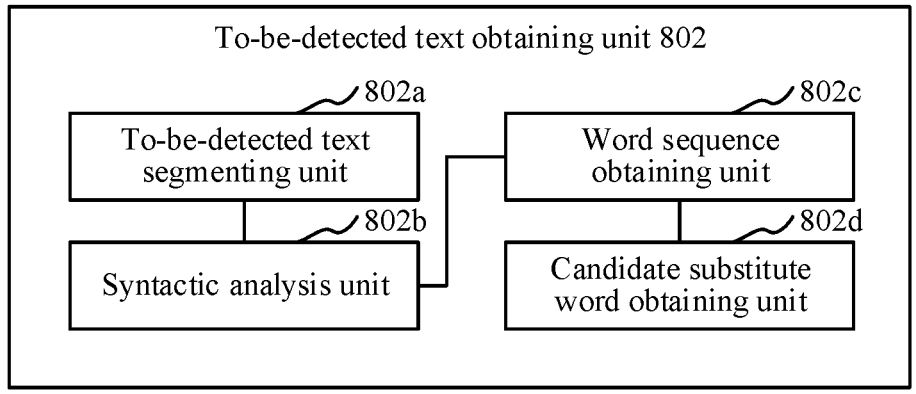
FIG. 12 is a structural block diagram of a to-be-detected text obtaining module according to an embodiment.

In an embodiment, as shown in FIG. 12, the to-be-detected text obtaining module 802 includes:

A to-be-detected text segmenting unit 802a, configured to segment the to-be-detected text into words.

A syntactic analysis unit 802b, configured to perform syntactic analysis on each of the words, and determine the position of the to-be-detected word according to a syntactic analysis result.

A word sequence obtaining unit 802c, configured to obtain an ante-context word sequence and a post-context word sequence according to the position of the to-be-detected word, and form the context word set from the ante-context word sequence and the post-context word sequence.

A candidate substitute word obtaining unit 802d, configured to obtain the candidate substitute words according to the syntactic analysis result, and form the candidate substitute word set from the candidate substitute words.

In an embodiment, the data processing apparatus 800 further includes a feature processing module, configured to perform, by the pronoun resolution neural network, dimensional transformation and length scaling processing on the first feature and the second feature, to obtain a first target feature and a second target feature. The iteration processing module 806 is configured to perform, by the pronoun resolution neural network, the positive-example iteration processing according to the first target feature and the second target feature to obtain the corresponding positive-example feature vector length, and perform the negative-example iteration processing according to the first target feature and the second target feature to obtain the corresponding negative-example feature vector length.

In an embodiment, the feature extraction module 804 is further configured to perform, by the pronoun resolution neural network, compressed representation processing on a word sequence in the context word set using a forward feature representation sub-network and a reverse feature representation sub-network, to obtain a first forward sub-feature and a first reverse sub-feature feature; perform, by the pronoun resolution neural network, the compressed representation processing on a character sequence corresponding to the word sequence in the context word set to obtain a first character vector sub-feature, and use the first forward sub-feature, the first reverse sub-feature, and the first character vector sub-feature to constitute the first feature corresponding to the context word set; perform, by the pronoun resolution neural network, the compressed representation processing on a word sequence in the candidate substitute word set using the forward feature representation sub-network and the reverse feature representation sub-network, to obtain a second forward sub-feature and a second reverse sub-feature feature; and perform, by the pronoun resolution neural network, the compressed representation processing on a character sequence corresponding to the word sequence in the candidate substitute word set to obtain a second character vector sub-feature, and use the second forward sub-feature, the second reverse sub-feature, and the second character vector sub-feature to constitute the second feature corresponding to the candidate substitute word set.

In an embodiment, the iteration processing module 806 is further configured to calculate an initial positive-example iteration center of the positive-example iteration processing according to the first feature and the second feature, and use the initial positive-example iteration center as a current positive-example iteration center; linearly transform the first feature and the second feature according to a preset positive-example weight coefficient, to obtain a first positive-example intermediate feature and a second positive-example intermediate feature; respectively calculate a similarity between the first positive-example intermediate feature and the current positive-example iteration center and a similarity between the second positive-example intermediate feature and the current positive-example iteration center, to obtain a first positive-example similarity and a second positive-example similarity; normalize the first positive-example similarity and the second positive-example similarity, to obtain a first positive-example intermediate similarity and a second positive-example intermediate similarity; calculate an initial positive-example feature vector length according to the first positive-example intermediate similarity, the corresponding first positive-example intermediate feature, and the second positive-example intermediate similarity and the corresponding second positive-example intermediate feature; and calculate an updated positive-example iteration center according to the initial positive-example feature vector length and the initial positive-example iteration center, use the updated positive-example iteration center as the current positive-example iteration center, and perform the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length.

In another embodiment, the iteration processing module 806 is further configured to calculate an initial negative-example iteration center of the negative-example iteration processing according to the first feature and the second feature, and use the initial negative-example iteration center as a current negative-example iteration center; linearly transform the first feature and the second feature according to a preset negative-example weight coefficient, to obtain a first negative-example intermediate feature and a second negative-example intermediate feature; respectively calculate a similarity between the first negative-example intermediate feature and the current negative-example iteration center and a similarity between the second negative-example intermediate feature and the current negative-example iteration center, to obtain a first negative-example similarity and a second negative-example similarity; normalize the first negative-example similarity and the second negative-example similarity, to obtain a first negative-example intermediate similarity and a second negative-example intermediate similarity; calculate an initial negative-example feature vector length according to the first negative-example intermediate similarity and the corresponding first negative-example intermediate feature, and the second negative-example intermediate similarity and the corresponding second negative-example intermediate feature; and calculate an updated negative-example iteration center according to the initial negative-example feature vector length and the initial negative-example iteration center, use the updated negative-example iteration center as the current negative-example iteration center, and perform the operation of respectively calculating a similarity between the first negative-example intermediate feature and the current negative-example iteration center and a similarity between the second negative-example intermediate feature and the current negative-example iteration center until a convergence condition is satisfied, to obtain the negative-example feature vector length.

Figure 13:
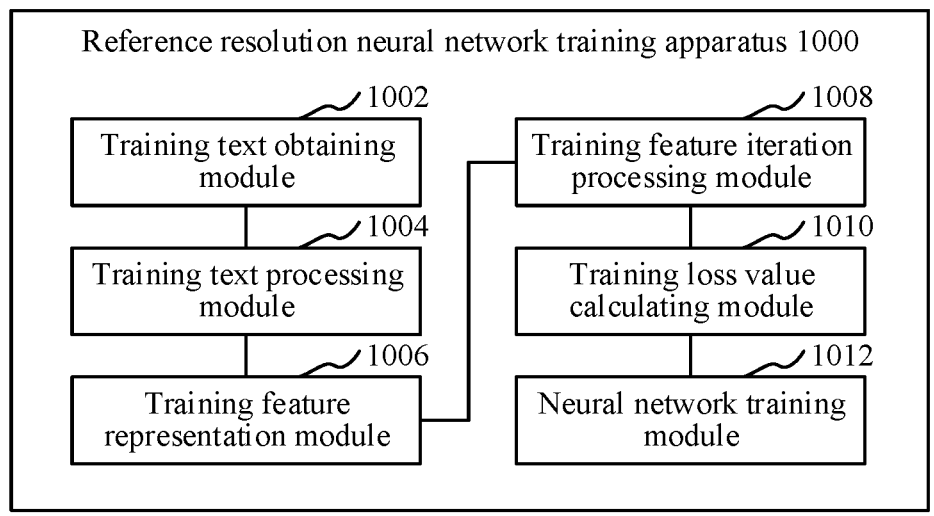
FIG. 13 is a structural block diagram of a pronoun resolution neural network training apparatus according to an embodiment.

In an embodiment, as shown in FIG. 13, a pronoun resolution neural network training apparatus 1000 is provided, including:

A training text obtaining module 1002, configured to obtain a training text, the training text comprising a corresponding standard training text tag.

A training text processing module 1004, configured to determine a training context word set and a training candidate substitute word set corresponding to a to-be-detected word in the training text.

A training feature representation module 1006, configured to input the training context word set and the training candidate substitute word set into an initial pronoun resolution neural network, and respectively perform, by the initial pronoun resolution neural network, feature extraction on the training context word set and the training candidate substitute word set, to obtain a first training feature and a second training feature.

A training feature iteration processing module 1008, configured to perform, by the initial pronoun resolution neural network, positive-example iteration processing according to the first training feature and the second training feature, to obtain a corresponding positive-example training feature vector length, performing negative-example iteration processing according to the first training feature and the second training feature, to obtain a corresponding negative-example training feature vector length, and calculate a training substitute probability corresponding to each training candidate substitute word in the training candidate substitute word set according to the positive-example training feature vector length and the negative-example training feature vector length.

A training loss value calculating module 1010, configured to calculate a training loss value according to the training substitute probability corresponding to the each training candidate substitute word and the corresponding standard training text tag.

A neural network training module 1012, configured to adjust model parameters of the initial pronoun resolution neural network according to the training loss value until a convergence condition is satisfied, to obtain the pronoun resolution neural network.

In an embodiment, the training text obtaining module is further configured to obtain an anti-interference feature set; and the training feature iteration processing module is further configured to input an anti-interference feature in the anti-interference feature set into the initial pronoun resolution neural network, generate, by the initial pronoun resolution neural network, an additional training feature according to the first training feature, the second training feature, and the anti-interference feature, perform, by the initial pronoun resolution neural network, the positive-example iteration processing according to the first training feature, the second training feature, the anti-interference features and the additional training feature, to obtain the corresponding positive-example training feature vector length, and perform the negative-example iteration processing according to the first training feature, the second training feature, the anti-interference feature and the additional training feature, to obtain the corresponding negative-example training feature vector length.

In an embodiment, the training feature iteration processing module 1008 is further configured to calculate a positive-example training substitute probability and a negative-example training substitute probability corresponding to the each training candidate substitute word in the training candidate substitute word set according to the positive-example training feature vector length and the negative-example training feature vector length. The training loss value calculating module 1010 is further configured to calculate the training loss value according to the positive-example training substitute probability corresponding to the each training candidate substitute word and the corresponding standard training text tag, the negative-example training substitute probability and the corresponding standard training text tag.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
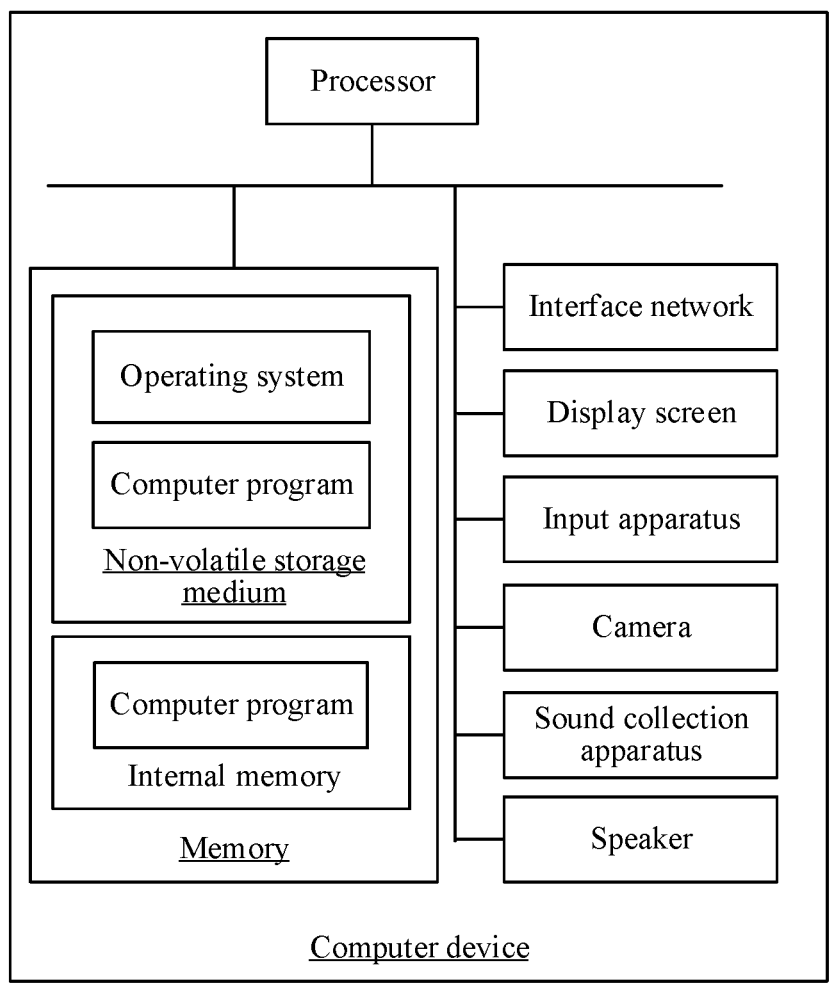
FIG. 14 is a structural block diagram of a computer device according to an embodiment.

FIG. 14 is a structural block diagram of a computer device according to an embodiment. Specifically, the computer device may be the terminal 110 or the server 120 in FIG. 1. As shown in FIG. 14, the computer device includes a processor, a memory, a network interface, an input apparatus, and a display screen connected via a system bus. The memory includes a non-volatile storage medium and an internal memory. The non-volatile storage medium of the computer device stores an operating system, and may further store a computer program. The computer program, when executed by the processor, causes the processor to perform the operations of the data processing method or the pronoun resolution neural network training method. The internal memory may store a computer program. The computer program, when executed by the processor, causes the processor to perform the operations of the data processing method or the pronoun resolution neural network training method. The display screen of the computer device may be a liquid crystal display screen or an e-ink display screen. The input apparatus of the computer device may be a touch layer covering the display screen; or a button, a trackball, a touchpad provided on a housing of the computer device; or an external keyboard, touchpad, mouse, etc. If the computer device is the server 120 in FIG. 1, the computer device does not include the display screen.

A person skilled in the art may understand that the structure shown in FIG. 14 is only a block diagram of a partial structure related to the solution of the present disclosure, and does not limit the computer device to which the solution of the present disclosure is applied. Specifically, the computer device may include more or less components than those shown in the figure, or some components may be combined, or different component deployment may be used.

In an embodiment, the data processing apparatus and the pronoun resolution neural network training apparatus may be realized by the computer program, which may be executed on the computer device shown in FIG. 14. The memory of the computer device may store the program modules that constitute the data processing apparatus or the pronoun resolution neural network training apparatus. For instance, the program modules include the to-be-detected text obtaining module, the feature extraction module, the iteration processing module, the target substitute word determining module, and the target substitute word inserting module shown in FIG. 11. The computer program constituted by the program modules causes the processor to perform the operations of the data processing method described in the embodiments of the present disclosure. For another instance, the program modules include the training text obtaining module, the training text processing module, the training feature representation module, the training feature iteration processing module, the training loss value calculating module, and the neural network training module shown in FIG. 13.

For instance, the computer device may use the to-be-detected text obtaining module in the data processing apparatus shown in FIG. 11 to obtain the to-be-detected text, and determine the context word set and the candidate substitute word set corresponding to the to-be-detected word in the to-be-detected text; use the feature extraction module to input the context word set and the candidate substitute word set into the pronoun resolution neural network, and respectively perform, by the pronoun resolution neural network, the feature extraction on the context word set and the candidate substitute word set to obtain a first feature and a second feature; use the iteration processing module to perform, by the pronoun resolution neural network, positive-example iteration processing according to the first feature and the second feature to obtain a corresponding positive-example feature vector length, perform negative-example iteration processing according to the first feature and the second feature to obtain a corresponding negative-example feature vector length, and calculate a substitute probability corresponding to each candidate substitute word in the candidate substitute word set according to the positive-example feature vector length and the negative-example feature vector length; use the target substitute word determining module to determine a target substitute word according to the substitute probability corresponding to the each candidate substitute word; and use the target substitute word inserting module to insert the target substitute word into the to-be-detected text according to a position corresponding to the to-be-detected word, to obtain a target text.

In an embodiment, a computer device is provided, including a processor and a memory. The memory stores a computer program. The computer program, when executed by the processor, causes the processor to perform the operations of the data processing method or the pronoun resolution neural network training method. The operations of the data processing method or the pronoun resolution neural network training method may be those in the data processing method or the pronoun resolution neural network training method according to any of the foregoing embodiments.

In an embodiment, a computer-readable storage medium is provided, storing a computer program. The computer program, when executed by a processor, causes the processor to perform the operations of the data processing method or the pronoun resolution neural network training method.

The operations of the data processing method or the pronoun resolution neural network training method may be those in the data processing method or the pronoun resolution neural network training method according to any of the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of the present disclosure and are described in detail, but they are not construed as a limit to the scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A data processing method, executed by a computer device, comprising:
 obtaining a to-be-detected text, and determining a context word set and a candidate substitute word set corresponding to a to-be-detected word in the to-be-detected text;
 inputting the context word set and the candidate substitute word set into a pronoun resolution neural network, and performing, by the pronoun resolution neural network, feature extraction respectively on the context word set and the candidate substitute word set to obtain a first feature and a second feature;
 performing, by the pronoun resolution neural network, positive-example iteration processing according to the first feature and the second feature to obtain a positive-example feature vector length, performing negative-example iteration processing according to the first feature and the second feature to obtain a negative-example feature vector length, and calculating a substitute probability corresponding to each candidate substitute word in the candidate substitute word set according to the positive-example feature vector length and the negative-example feature vector length, comprising,
  calculating an initial positive-example iteration center of the positive-example iteration processing according to the first feature and the second feature, and using the initial positive-example iteration center as a current positive-example iteration center;
  linearly transforming the first feature and the second feature according to a preset positive-example weight coefficient, to obtain a first positive-example intermediate feature and a second positive-example intermediate feature;
  respectively calculating a similarity between the first positive-example intermediate feature and the current positive-example iteration center and a similarity between the second positive-example intermediate feature and the current positive-example iteration center, to obtain a first positive-example similarity and a second positive-example similarity;
  normalizing the first positive-example similarity and the second positive-example similarity, to obtain a first positive-example intermediate similarity and a second positive-example intermediate similarity;
  calculating an initial positive-example feature vector length according to the first positive-example intermediate similarity and the corresponding first positive-example intermediate feature, and the second positive-example intermediate similarity and the corresponding second positive-example intermediate feature; and
  calculating an updated positive-example iteration center according to the initial positive-example feature vector length and the initial positive-example iteration center, using the updated positive-example iteration center as the current positive-example iteration center, and performing the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length;
 determining a target substitute word according to the substitute probability corresponding to the each candidate substitute word; and
 inserting the target substitute word into the to-be-detected text according to a position corresponding to the to-be-detected word, to obtain a target text.

2. The data processing method according to claim 1, wherein after the performing, by the pronoun resolution neural network, feature extraction respectively on the context word set and the candidate substitute word set to obtain a first feature and a second feature, the method further comprises:
 performing, by the pronoun resolution neural network, dimensional transformation and length scaling processing on the first feature and the second feature, to obtain a first target feature and a second target feature; and
 the performing, by the pronoun resolution neural network, positive-example iteration processing according to the first feature and the second feature to obtain a positive-example feature vector length, performing negative-example iteration processing according to the first feature and the second feature to obtain a negative-example feature vector length comprises:

performing, by the pronoun resolution neural network, the positive-example iteration processing according to the first target feature and the second target feature to obtain the positive-example feature vector length, and performing the negative-example iteration processing according to the first target feature and the second target feature to obtain the negative-example feature vector length.

3. The data processing method according to claim 1, wherein the determining a context word set and a candidate substitute word set corresponding to a to-be-detected word in the to-be-detected text comprises:
   segmenting the to-be-detected text into words;
   performing syntactic analysis on each of the words, and determining the position of the to-be-detected word according to a syntactic analysis result;
   obtaining an ante-context word sequence and a post-context word sequence according to the position of the to-be-detected word, and forming the context word set from the ante-context word sequence and the post-context word sequence; and
   obtaining candidate substitute words according to the syntactic analysis result, and forming the candidate substitute word set from the candidate substitute words.

4. The data processing method according to claim 3, wherein the performing, by the pronoun resolution neural network, feature extraction respectively on the context word set and the candidate substitute word set to obtain a first feature and a second feature comprises:
   performing, by the pronoun resolution neural network, compressed representation processing on a word sequence in the context word set using a forward feature representation sub-network and a reverse feature representation sub-network, to obtain a first forward sub-feature and a first reverse sub-feature feature;
   performing, by the pronoun resolution neural network, the compressed representation processing on a character sequence corresponding to the word sequences in the context word set to obtain a first character vector sub-feature, and using the first forward sub-feature, the first reverse sub-feature, and the first character vector sub-feature to constitute the first feature corresponding to the context word set;
   performing, by the pronoun resolution neural network, the compressed representation processing on a word sequence in the candidate substitute word set using the forward feature representation sub-network and the reverse feature representation sub-network, to obtain a second forward sub-feature and a second reverse sub-feature feature; and
   performing, by the pronoun resolution neural network, the compressed representation processing on a character sequence corresponding to the word sequence in the candidate substitute word set to obtain a second character vector sub-feature, and using the second forward sub-feature, the second reverse sub-feature, and the second character vector sub-feature to constitute the second feature corresponding to the candidate substitute word set.

5. The data processing method according to claim 1, wherein the performing negative-example iteration processing according to the first feature and the second feature to obtain a negative-example feature vector length comprises:
   calculating an initial negative-example iteration center of the negative-example iteration processing according to the first feature and the second feature, and using the initial negative-example iteration center as a current negative-example iteration center;
   linearly transforming the first feature and the second feature according to a preset negative-example weight coefficient, to obtain a first negative-example intermediate feature and a second negative-example intermediate feature;
   respectively calculating a similarity between the first negative-example intermediate feature and the current negative-example iteration center and a similarity between the second negative-example intermediate feature and the current negative-example iteration center, to obtain a first negative-example similarity and a second negative-example similarity;
   normalizing the first negative-example similarity and the second negative-example similarity, to obtain a first negative-example intermediate similarity and a second negative-example intermediate similarity;
   calculating an initial negative-example feature vector length according to the first negative-example intermediate similarity and the corresponding first negative-example intermediate feature, and the second negative-example intermediate similarity and the corresponding second negative-example intermediate feature; and
   calculating an updated negative-example iteration center according to the initial negative-example feature vector length and the initial negative-example iteration center, using the updated negative-example iteration center as the current negative-example iteration center, and performing the operation of respectively calculating a similarity between the first negative-example intermediate feature and the current negative-example iteration center and a similarity between the second negative-example intermediate feature and the current negative-example iteration center until a convergence condition is satisfied, to obtain the negative-example feature vector length.

6. The data processing method according to claim 1, further comprising:
   training the pronoun resolution neural network, comprising:
      obtaining a training text, the training text comprising a corresponding standard training text tag;
      determining a training context word set and a training candidate substitute word set corresponding to a to-be-detected training word in the training text;
      inputting the training context word set and the training candidate substitute word set into an initial pronoun resolution neural network, and performing, by the initial pronoun resolution neural network, feature extraction respectively on the training context word set and the training candidate substitute word set, to obtain a first training feature and a second training feature;
      performing, by the initial pronoun resolution neural network, positive-example iteration processing according to the first training feature and the second training feature, to obtain a positive-example training feature vector length, performing negative-example iteration processing according to the first training feature and the second training feature, to obtain a negative-example training feature vector length, and calculating a training substitute probability corresponding to each training candidate substitute word in the training candidate substitute word set according to the positive-example training feature vector length and the negative-example training feature vector length;

calculating a training loss value according to the training substitute probability corresponding to the each training candidate substitute word and the standard training text tag; and adjusting a model parameter of the initial pronoun resolution neural network according to the training loss value until a convergence condition is satisfied, to obtain the pronoun resolution neural network.

7. The data processing method according to claim 6, wherein training the pronoun resolution neural network further comprises:

obtaining an anti-interference feature set; and inputting an anti-interference feature in the anti-interference feature set into the initial pronoun resolution neural network, and generating, by the initial pronoun resolution neural network, an additional training feature according to the first training feature, the second training feature, and the anti-interference feature; and the performing, by the initial pronoun resolution neural network, positive-example iteration processing according to the first training feature and the second training feature, to obtain a positive-example training feature vector length, performing negative-example iteration processing according to the first training feature and the second training feature, to obtain a negative-example training feature vector length comprises:

performing, by the initial pronoun resolution neural network, the positive-example iteration processing according to the first training feature, the second training feature, the anti-interference feature and the additional training feature, to obtain the positive-example training feature vector length, and performing the negative-example iteration processing according to the first training feature, the second training feature, the anti-interference feature and the additional training feature, to obtain the negative-example training feature vector length.

8. The data processing method according to claim 6, wherein, the calculating a training substitute probability corresponding to each training candidate substitute word in the training candidate substitute word set according to the positive-example training feature vector length and the negative-example training feature vector length comprises:

calculating a positive-example training substitute probability and a negative-example training substitute probability corresponding to the each training candidate substitute word in the training candidate substitute word set according to the positive-example training feature vector length and the negative-example training feature vector length; and the calculating a training loss value according to the training substitute probability corresponding to the each training candidate substitute word and the corresponding standard training text tag comprises:

calculating the training loss value according to the positive-example training substitute probability corresponding to the each training candidate substitute word and the corresponding standard training text tag, and the negative-example training substitute probability and the corresponding standard training text tag.

9. A data processing apparatus, comprising a memory and a processor, the memory storing a computer program, and the computer program, when executed by the processor, causing the processor to:

obtain a to-be-detected text, and determine a context word set and a candidate substitute word set corresponding to a to-be-detected word in the to-be-detected text;

input the context word set and the candidate substitute word set into a pronoun resolution neural network, and perform, by the pronoun resolution neural network, feature extraction respectively on the context word set and the candidate substitute word set to obtain a first feature and a second feature;

perform, by the pronoun resolution neural network, positive-example iteration processing according to the first feature and the second feature to obtain a positive-example feature vector length, perform negative-example iteration processing according to the first feature and the second feature to obtain a negative-example feature vector length, and calculate a substitute probability corresponding to each candidate substitute word in the candidate substitute word set according to the positive-example feature vector length and the negative-example feature vector length, comprising:

calculate an initial positive-example iteration center of the positive-example iteration processing according to the first feature and the second feature, and use the initial positive-example iteration center as a current positive-example iteration center;

linearly transform the first feature and the second feature according to a preset positive-example weight coefficient, to obtain a first positive-example intermediate feature and a second positive-example intermediate feature;

respectively calculate a similarity between the first positive-example intermediate feature and the current positive-example iteration center and a similarity between the second positive-example intermediate feature and the current positive-example iteration center, to obtain a first positive-example similarity and a second positive-example similarity;

normalize the first positive-example similarity and the second positive-example similarity, to obtain a first positive-example intermediate similarity and a second positive-example intermediate similarity;

calculate an initial positive-example feature vector length according to the first positive-example intermediate similarity and the corresponding first positive-example intermediate feature, and the second positive-example intermediate similarity and the corresponding second positive-example intermediate feature; and calculate an updated positive-example iteration center according to the initial positive-example feature vector length and the initial positive-example iteration center, use the updated positive-example iteration center as the current positive-example iteration center, and perform the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length;

determine a target substitute word according to the substitute probability corresponding to the each candidate substitute word; and insert the target substitute word into the to-be-detected text according to a position corresponding to the to-be-detected word, to obtain a target text.

10. The data processing apparatus according to claim 9, wherein the computer program further cause the processor to
perform, by the pronoun resolution neural network, dimensional transformation and length scaling processing on the first feature and the second feature, to obtain a first target feature and a second target feature; and
perform, by the pronoun resolution neural network, the positive-example iteration processing according to the first target feature and the second target feature to obtain the positive-example feature vector length, and perform the negative-example iteration processing according to the first target feature and the second target feature to obtain the negative-example feature vector length.

11. The data processing apparatus according to claim 9, wherein when determining the context word set and the candidate substitute word set, the computer program further cause the processor to:
segment the to-be-detected text into words;
perform syntactic analysis on each of the words, and determine the position of the to-be-detected word according to a syntactic analysis result;
obtain an ante-context word sequence and a post-context word sequence according to the position of the to-be-detected word, and form the context word set from the ante-context word sequence and the post-context word sequence; and
a candidate substitute word obtaining unit, configured to obtain the candidate substitute words according to the syntactic analysis result, and form the candidate substitute word set from the candidate substitute words.

12. The data processing apparatus according to claim 11, wherein the computer program further cause the processor to:
perform, by the pronoun resolution neural network, compressed representation processing on a word sequence in the context word set using a forward feature representation sub-network and a reverse feature representation sub-network, to obtain a first forward sub-feature and a first reverse sub-feature feature;
perform, by the pronoun resolution neural network, the compressed representation processing on a character sequence corresponding to the word sequences in the context word set to obtain a first character vector sub-feature, and use the first forward sub-feature, the first reverse sub-feature, and the first character vector sub-feature to constitute the first feature corresponding to the context word set;
perform, by the pronoun resolution neural network, the compressed representation processing on a word sequence in the candidate substitute word set using the forward feature representation sub-network and the reverse feature representation sub-network, to obtain a second forward sub-feature and a second reverse sub-feature feature; and
perform, by the pronoun resolution neural network, the compressed representation processing on a character sequence corresponding to the word sequence in the candidate substitute word set to obtain a second character vector sub-feature, and use the second forward sub-feature, the second reverse sub-feature, and the second character vector sub-feature to constitute the second feature corresponding to the candidate substitute word set.

13. The data processing apparatus according to claim 9, wherein the computer program further cause the processor to:

calculate an initial negative-example iteration center of the negative-example iteration processing according to the first feature and the second feature, and use the initial negative-example iteration center as a current negative-example iteration center;
linearly transform the first feature and the second feature according to a preset negative-example weight coefficient, to obtain a first negative-example intermediate feature and a second negative-example intermediate feature;
respectively calculate a similarity between the first negative-example intermediate feature and the current negative-example iteration center and a similarity between the second negative-example intermediate feature and the current negative-example iteration center, to obtain a first negative-example similarity and a second negative-example similarity;
normalize the first negative-example similarity and the second negative-example similarity, to obtain a first negative-example intermediate similarity and a second negative-example intermediate similarity;
calculate an initial negative-example feature vector length according to the first negative-example intermediate similarity and the corresponding first negative-example intermediate feature, and the second negative-example intermediate similarity and the corresponding second negative-example intermediate feature; and
calculate an updated negative-example iteration center according to the initial negative-example feature vector length and the initial negative-example iteration center, use the updated negative-example iteration center as the current negative-example iteration center, and perform the operation of respectively calculating a similarity between the first negative-example intermediate feature and the current negative-example iteration center and a similarity between the second negative-example intermediate feature and the current negative-example iteration center until a convergence condition is satisfied, to obtain the negative-example feature vector length.

14. The data processing apparatus according to claim 9, wherein the computer program further cause the processor to train the pronoun resolution neural network, comprising:
obtaining a training text, the training text comprising a corresponding standard training text tag;
determining a training context word set and a training candidate substitute word set corresponding to a to-be-detected training word in the training text;
inputting the training context word set and the training candidate substitute word set into an initial pronoun resolution neural network, and performing, by the initial pronoun resolution neural network, feature extraction respectively on the training context word set and the training candidate substitute word set, to obtain a first training feature and a second training feature;
performing, by the initial pronoun resolution neural network, positive-example iteration processing according to the first training feature and the second training feature, to obtain a corresponding positive-example training feature vector length, performing negative-example iteration processing according to the first training feature and the second training feature, to obtain a corresponding negative-example training feature vector length, and calculating a training substitute probability corresponding to each training candidate substitute word in the training candidate substitute word set according to the positive-example training feature vector length and the negative-example training feature vector length;

calculating a training loss value according to the training substitute probability corresponding to the each training candidate substitute word and the corresponding standard training text tag; and adjusting a model parameter of the initial pronoun resolution neural network according to the training loss value until a convergence condition is satisfied, to obtain the pronoun resolution neural network.

15. The data processing apparatus according to claim 14, wherein, when training the pronoun resolution neural network, the computer program further cause the processor to obtain an anti-interference feature set; input an anti-interference feature in the anti-interference feature set into the initial pronoun resolution neural network, generate, by the initial pronoun resolution neural network, an additional training feature according to the first training feature, the second training feature, and the anti-interference feature, perform, by the initial pronoun resolution neural network, the positive-example iteration processing according to the first training feature, the second training feature, the anti-interference feature and the additional training feature, to obtain the corresponding positive-example training feature vector length, and perform the negative-example iteration processing according to the first training feature, the second training feature, the anti-interference feature and the additional training feature, to obtain the corresponding negative-example training feature vector length.

16. The data processing apparatus according to claim 14, wherein, when training the pronoun resolution neural network, the computer program further cause the processor to:

calculate a positive-example training substitute probability and a negative-example training substitute probability corresponding to the each training candidate substitute word in the training candidate substitute word set according to the positive-example training feature vector length and the negative-example training feature vector length; and calculate the training loss value according to the positive-example training substitute probability corresponding to the each training candidate substitute word and the corresponding standard training text tag, and the negative-example training substitute probability and the corresponding standard training text tag.

17. A non-transitory computer-readable storage medium, storing a computer program, the computer program, when executed by a processor, causing the processor to perform:

obtaining a to-be-detected text, and determining a context word set and a candidate substitute word set corresponding to a to-be-detected word in the to-be-detected text;

inputting the context word set and the candidate substitute word set into a pronoun resolution neural network, and performing, by the pronoun resolution neural network, feature extraction respectively on the context word set and the candidate substitute word set to obtain a first feature and a second feature;

performing, by the pronoun resolution neural network, positive-example iteration processing according to the first feature and the second feature to obtain a positive-example feature vector length, performing negative-example iteration processing according to the first feature and the second feature to obtain a negative-example feature vector length, and calculating a substitute probability corresponding to each candidate substitute word in the candidate substitute word set according to the positive-example feature vector length and the negative-example feature vector length, comprising:

calculating an initial positive-example iteration center of the positive-example iteration processing according to the first feature and the second feature, and using the initial positive-example iteration center as a current positive-example iteration center;

linearly transforming the first feature and the second feature according to a preset positive-example weight coefficient, to obtain a first positive-example intermediate feature and a second positive-example intermediate feature;

respectively calculating a similarity between the first positive-example intermediate feature and the current positive-example iteration center and a similarity between the second positive-example intermediate feature and the current positive-example iteration center, to obtain a first positive-example similarity and a second positive-example similarity;

normalizing the first positive-example similarity and the second positive-example similarity, to obtain a first positive-example intermediate similarity and a second positive-example intermediate similarity;

calculating an initial positive-example feature vector length according to the first positive-example intermediate similarity and the corresponding first positive-example intermediate feature, and the second positive-example intermediate similarity and the corresponding second positive-example intermediate feature; and calculating an updated positive-example iteration center according to the initial positive-example feature vector length and the initial positive-example iteration center, using the updated positive-example iteration center as the current positive-example iteration center, and performing the operation of respectively calculating a similarity between the first positive-example intermediate feature and the current positive-example iteration center and a similarity between the second positive-example intermediate feature and the current positive-example iteration center until a convergence condition is satisfied, to obtain the positive-example feature vector length;

determining a target substitute word according to the substitute probability corresponding to the each candidate substitute word; and inserting the target substitute word into the to-be-detected text according to a position corresponding to the to-be-detected word, to obtain a target text.

18. The storage medium according to claim 17, wherein after the performing, by the pronoun resolution neural network, feature extraction respectively on the context word set and the candidate substitute word set to obtain a first feature and a second feature, the method further comprises:

performing, by the pronoun resolution neural network, dimensional transformation and length scaling processing on the first feature and the second feature, to obtain a first target feature and a second target feature; and the performing, by the pronoun resolution neural network, positive-example iteration processing according to the first feature and the second feature to obtain a positive-example feature vector length, performing negative-example iteration processing according to the first feature and the second feature to obtain a negative-example feature vector length comprises:

performing, by the pronoun resolution neural network, the positive-example iteration processing according to the first target feature and the second target feature to obtain the positive-example feature vector length, and performing the negative-example iteration processing according to the first target feature and the second target feature to obtain the negative-example feature vector length.

\* \* \* \* \*